United States Patent
Kazanov et al.

(10) Patent No.: US 7,164,238 B2
(45) Date of Patent: Jan. 16, 2007

(54) ENERGY SAVINGS DEVICE AND METHOD FOR A RESISTIVE AND/OR AN INDUCTIVE LOAD AND/OR A CAPACITIVE LOAD

(75) Inventors: Anatoly L. Kazanov, Reistertown, MD (US); Anthony Paige, Fort Washington, MD (US); Mark Hall, Bowie, MD (US)

(73) Assignee: Astral Communications, Inc., Fort Washington, MD (US)

( * ) Notice: Subject to any disclaimer, the term of this patent is extended or adjusted under 35 U.S.C. 154(b) by 114 days.

(21) Appl. No.: 10/944,405

(22) Filed: Sep. 20, 2004

(65) Prior Publication Data

US 2005/0104543 A1    May 19, 2005

Related U.S. Application Data

(63) Continuation-in-part of application No. 10/454,840, filed on Jun. 5, 2003, now Pat. No. 6,836,080, which is a continuation-in-part of application No. 10/205,031, filed on Jul. 26, 2002, now Pat. No. 6,724,157.

(60) Provisional application No. 60/336,222, filed on Nov. 14, 2001.

(51) Int. Cl.
*H05B 37/02* (2006.01)

(52) U.S. Cl. ............................ 315/209 SC; 315/209 R; 315/291

(58) Field of Classification Search ...................... None
See application file for complete search history.

(56) References Cited

U.S. PATENT DOCUMENTS

| | | | |
|---|---|---|---|
| 4,250,432 A * | 2/1981 | Kohler | 315/291 |
| 4,733,138 A | 3/1988 | Pearlman et al. | |
| 4,965,492 A | 10/1990 | Boldwyn | |
| 5,059,871 A | 10/1991 | Pearlman et al. | |
| 5,187,419 A * | 2/1993 | DeLange | 318/805 |
| 5,357,170 A * | 10/1994 | Luchaco et al. | 315/159 |
| 5,381,078 A | 1/1995 | Szuba | |
| 5,430,356 A * | 7/1995 | Ference et al. | 315/291 |
| 5,910,875 A * | 6/1999 | Tian et al. | 361/78 |
| 6,020,724 A * | 2/2000 | O'Loughlin | 320/166 |
| 6,081,123 A * | 6/2000 | Kasbarian et al. | 324/521 |
| 6,369,517 B1 * | 4/2002 | Song et al. | 315/194 |
| 6,388,396 B1 | 5/2002 | Katyl et al. | |
| 6,388,399 B1 | 5/2002 | Eckel et al. | |
| 6,573,674 B1 * | 6/2003 | Rivet et al. | 318/431 |
| 6,700,333 B1 * | 3/2004 | Hirshi et al. | 315/291 |

* cited by examiner

*Primary Examiner*—Tuyet Thi Vo
(74) *Attorney, Agent, or Firm*—Foley & Lardner LLP

(57) ABSTRACT

An energy savings device for an inductive, a resistive or a capacitive load, such as a fluorescent light fixture having a magnetic ballast or an electronic ballast, which is powered by an AC voltage waveform. The energy savings device includes a setting unit for setting a desired power operating level for the load. The energy savings device also includes a processor configured to receive a signal from the setting unit indicative of the desired power operating level for the load, to determine a phase delay to be provided to an output AC voltage waveform that is to be provided to the load, and to output a control signal as a result thereof. The energy savings device further includes an active element provided between a line that provides the input AC voltage waveform and the load, the active element receiving the control signal and turning off and on at predetermined times in accordance with the control signal, so as to create the output AC voltage waveform from the AC voltage waveform. The processor includes a synchronization circuit that synchronizes to the Green Safety ground line.

19 Claims, 16 Drawing Sheets

ENERGY SAVINGS DEVICE AND METHOD FOR A RESISTIVE AND/OR AN INDUCTIVE LOAD AND/OR A CAPACITIVE LOAD

RELATED APPLICATIONS

This application is a continuation-in-part of U.S. patent application Ser. No. 10/454,840, filed Jun. 5, 2003, now is a U.S. Pat. No. 6,836,080, which is itself a continuation-in-part of U.S. patent application Ser. No. 10/205,031, filed Jul. 26, 2002 (which matured into U.S. Pat. No. 6,724,157, issued Apr. 20, 2004), whereby this application also claims priority to provisional patent application 60/336,222, filed Nov. 14, 2001.

BACKGROUND OF THE INVENTION

A. Field of the Invention

The invention relates to an energy savings device or method that can be applied to a resistive, an inductive, or a capacitive load regardless of the respective impedance or inductance or capacitance of the load. More particularly, the invention relates to a load dimming device that is mounted in series with a resistive, an inductive or a capacitive load and that has access for power and operation to one side of an electrical line supplied to the load. A fluorescent light fixture or a motor for a fan or other device, for example, can be controlled by way of an energy savings device or method according to the invention. The load dimming device can be used to control Compact Fluorescent Lamps, as well as other types of light fixtures, or a motor for a fan or other device.

B. Description of the Related Art

The ability to control illumination levels is strongly desired, especially due to the rising energy costs. Such ability to control illumination levels is very important for establishments that require a great deal of lighting, such as restaurants and offices.

Lighting levels that are higher than necessary not only result in a higher energy costs associated with the lighting, but also can increase air conditioning costs due to the excess heat provided by the lighting fixtures. Fluorescent light fixtures output less heat than incandescent light fixtures for equivalent illumination, and thus they are becoming more popular with offices or other commercial establishments.

There currently exist various types of dimmer devices that can be used in order to control the amount of light output by fluorescent lights. One type utilizes a complex electronic ballast which first converts the applied AC line voltage to DC, then switches the applied tube voltage at high frequency. The resulting power-to-light output efficiency is hampered by this additional manipulation. This type requires an expensive fixture replacement and rewiring to the wall switch. Simplistic phase control devices will not provide satisfactory results when controlling a magnetic ballast fluorescent fixture.

FIG. 1A shows the connections of a conventional fluorescent dimmer device or controller 100, which is provided between a line and a load. The load is shown as a light fixture 110, which may be a fluorescent tube and associated ballast, for example. As shown in FIG. 1A, the conventional controller 100 needs access to both sides (line 102 and neutral 104) of an AC power input, in addition to the load. Since connectivity to the neutral line 104 is not always available at a light switch box, conventional fluorescent controllers may require expensive re-wiring to be installed.

The problem with using such a conventional dimmer circuit for a fluorescent lighting fixture is that the conventional dimmer circuit cannot modulate reactive loads. Reactive loads react with the controller, thereby producing oscillations that then cause surges of voltage and current, which are both unpredictable and uncontrollable. With such control being applied to a fluorescent light fixture, the typical result is a non-harmonic type of flickering, which frequently takes the light from zero output to maximum output and to values in between. Such flickering is visually (and also audibly) discomforting, and may even be unhealthful to people who are near the flickering fluorescent light (for example, it may cause headaches due to having to view the undesirable light flickering).

As explained earlier, a controller such as the one shown in FIG. 1A can be used to control a fluorescent light without causing significant flickering, but such a controller requires fairly substantial installation costs, since they cannot be installed at a light switch box (where a neutral line is not typically provided), but rather have to be installed very close to the ballast (e.g., in the ceiling of a room, where a neutral line is provided).

U.S. Pat. No. 5,043,635 to Talbott et al. describes a two-line power control device for dimming fluorescent lights, which does not require to be coupled to a neutral line. Accordingly, the Talbott et al. device can in theory be installed at a light switch box. However, due to the analog structure and the various components described in the Talbott et al. device, such a device is very difficult to manufacture, and also such a device is very difficult to manufacture in a small size. Thus, it is not feasible to install such a device in a light switch box, given the bulkiness as well as the transformer configuration of the Talbott et al. device.

SUMMARY OF THE INVENTION

The present invention is directed to an apparatus and a method for controlling an amount of power supplied to a resistive, inductive or capacitive load by modulating a period of time that current flows through the load.

According to one aspect of the invention, there is provided an energy savings device for an inductive, resistive or capacitive load that is powered by an input AC voltage waveform. The device includes a setting unit for setting a desired power operating level for the load. The device also includes a processor configured to receive a signal from the setting unit indicative of the desired power operating level for the load, to determine a phase delay to be provided to an output AC voltage waveform that is to be provided to the load, and to output a control signal as a result thereof. The device further includes a synchronization circuit for synchronizing to a Safety Ground line, the synchronization circuit providing a synchronization signal that is used in construction of the control signal by the processor.

According to another aspect of the invention, there is provided an energy savings method for an inductive, resistive or capacitive load that is powered by an input AC voltage waveform. The method includes setting a desired power operating level for the load. The method further includes receiving a signal indicative of the desired power operating level for the load, and determining a phase delay to be provided to an output AC voltage waveform that is to be provided to the load, and to output a control signal as a result thereof. The method also includes synchronizing to a Safety Ground line, the synchronization circuit providing a synchronization signal that is used in construction of the control signal.

According to yet another aspect of the invention, there is provided a computer program product for providing energy savings for an inductive, resistive or capacitive load that is powered by an input AC voltage waveform. The computer program product includes first computer code configured to set a desired power operating level for the load. The computer program product also includes second computer code configured to receive a setting signal output from the first computer code that is indicative of the desired power operating level for the load, the second computer code further configured to determine a phase delay to be provided to an output AC voltage waveform that is to be provided to the load, and to output a control signal as a result thereof. The computer program product further includes third computer code configured to synchronize to a Safety Ground line, to thereby provide a synchronization signal that is used in construction of the control signal by the second computer code.

According to yet another aspect of the invention, there is provided an energy savings device for an inductive, resistive or capacitive load that is powered by an input AC voltage waveform. The energy savings device includes setting means for allowing a user to set a desired power operating level for the load. The energy savings device also includes processing means for receiving a signal from the setting unit indicative of the desired power operating level for the load, and for determining a phase delay to be provided to an output AC voltage waveform that is to be provided to the load, and to output a control signal as a result thereof. The energy savings device further includes synchronization means for synchronizing to a Safety Ground line, the synchronization means providing a synchronization signal that is used in construction of the control signal by the processing means.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

Preferred embodiments of the invention will be described in detail below, with reference to the accompanying drawings.

Figure 1A:
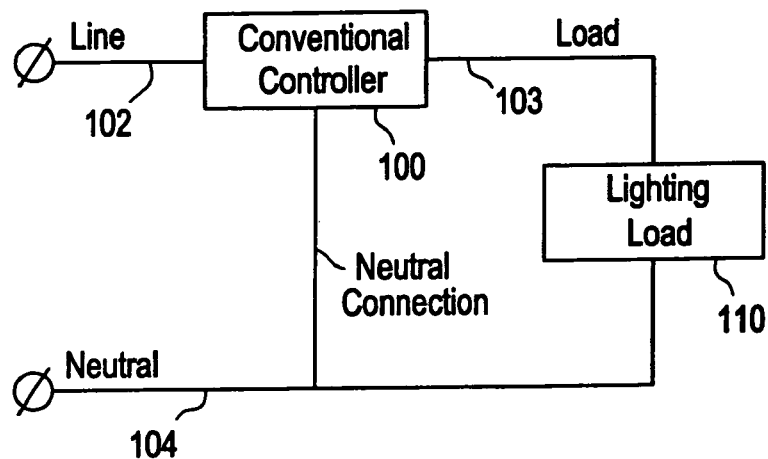
FIG. 1A shows a hookup of a conventional energy savings device that is provided between an input voltage line and a load.
Figure 1B:
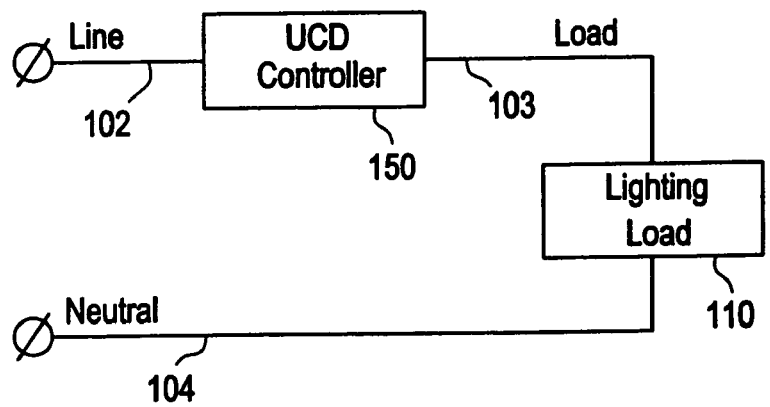
FIG. 1B shows a hookup of an energy savings device according to an embodiment of the invention that is provided between an input voltage line and a load.

The invention is directed to an apparatus and method for controlling power to a resistive, an inductive or a capacitive load, such as a fluorescent light fixture, a halogen light fixture, or a motor for a fan. In a preferred configuration, the energy controlling apparatus is configured to be installed in a light switch box typically located on an interior wall of a building, behind a wall switch plate. Since most light switches are mounted within a switch box that is easily accessible through the wall (e.g., behind a switch plate), the line to the switch is dropped from the fixture to the switch, and the other side of the line (e.g., neutral) is not conveniently present. The invention provides a true switch replacement and operates in series with an inductive or resistive load, in a two-wire configuration, plus safety ground wire. FIG. 1B shows a hookup of an energy savings device 150 according to an embodiment of the invention that is provided between the input AC line voltage 102 and a reactive load 110, whereby hookup to the neutral line 104 is not required by the energy savings device 150 in order to provide an energy control function for the load 110.

Figure 2:
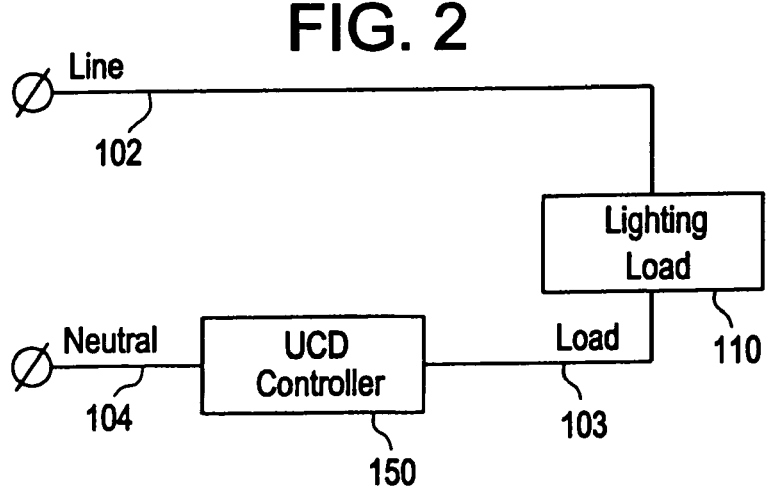
FIG. 2 shows an alternative hookup of an energy savings device according to an embodiment of the invention that provides neutral side control.

Additionally, referring now to FIG. 2, some installations will wire the line 102 directly to the light fixture 110, leaving the load return 103 for fixture control. In this case, there is no line 102 connection in the switch box, again disallowing integration of a conventional fluorescent dimmer device. The UCD controller 150 is fully compatible with neutral 104 side control, in the manner as shown in FIG. 2. In summary, the UCD controller according to the different embodiments of the invention is installed in series with the load, on either side of the load, without regard to wiring polarity, identically to a dry contact switch installation.

With regards to fluorescent light fixtures, the energy savings device according to the invention regulates a voltage output to gaseous discharge lamps of the fluorescent light fixture from the secondary coils of a ballast element of the fluorescent light fixture.

Figure 3:
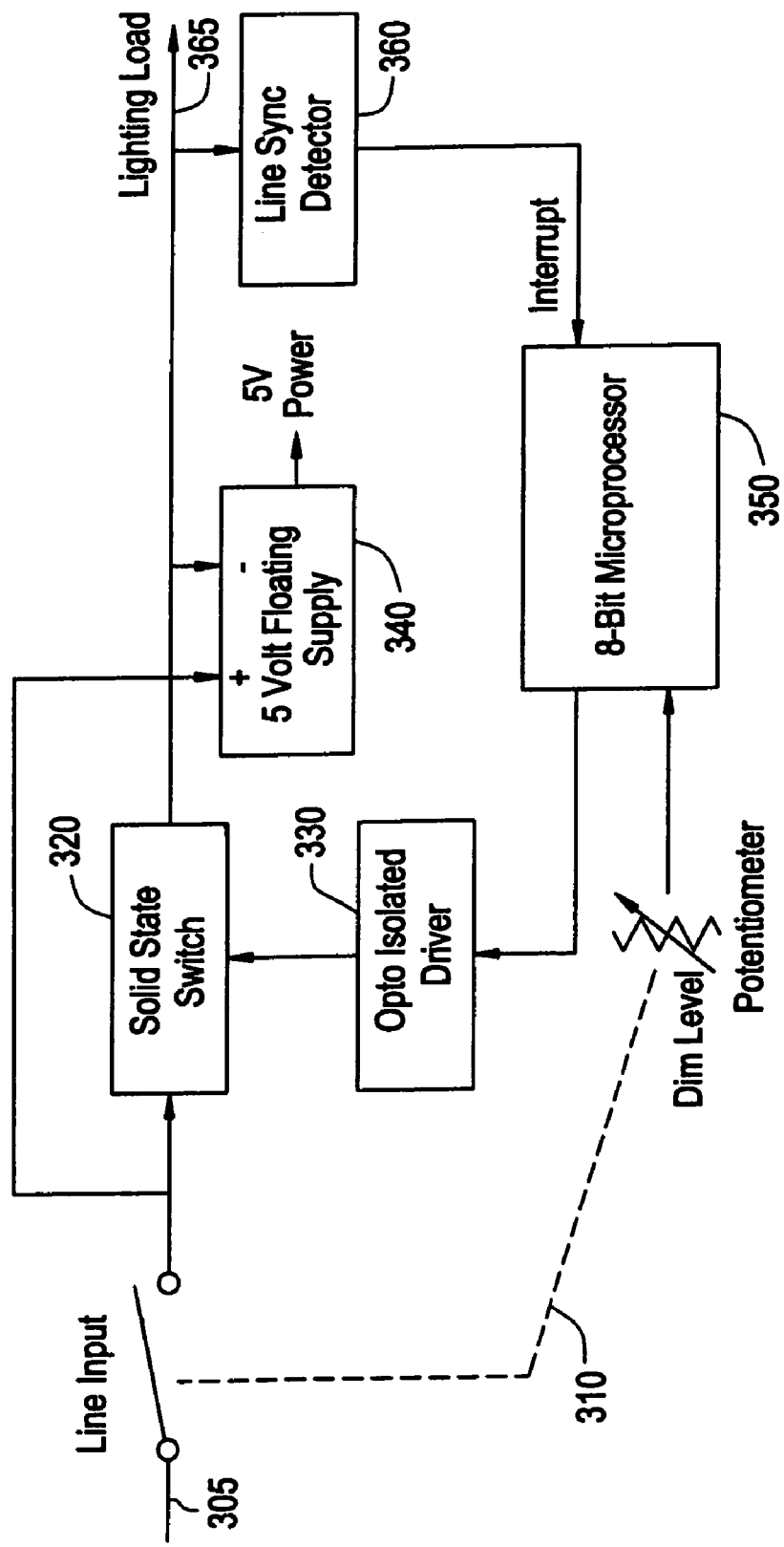
FIG. 3 is a block diagram of an energy savings device according to a first embodiment of the invention.
Figure 4:
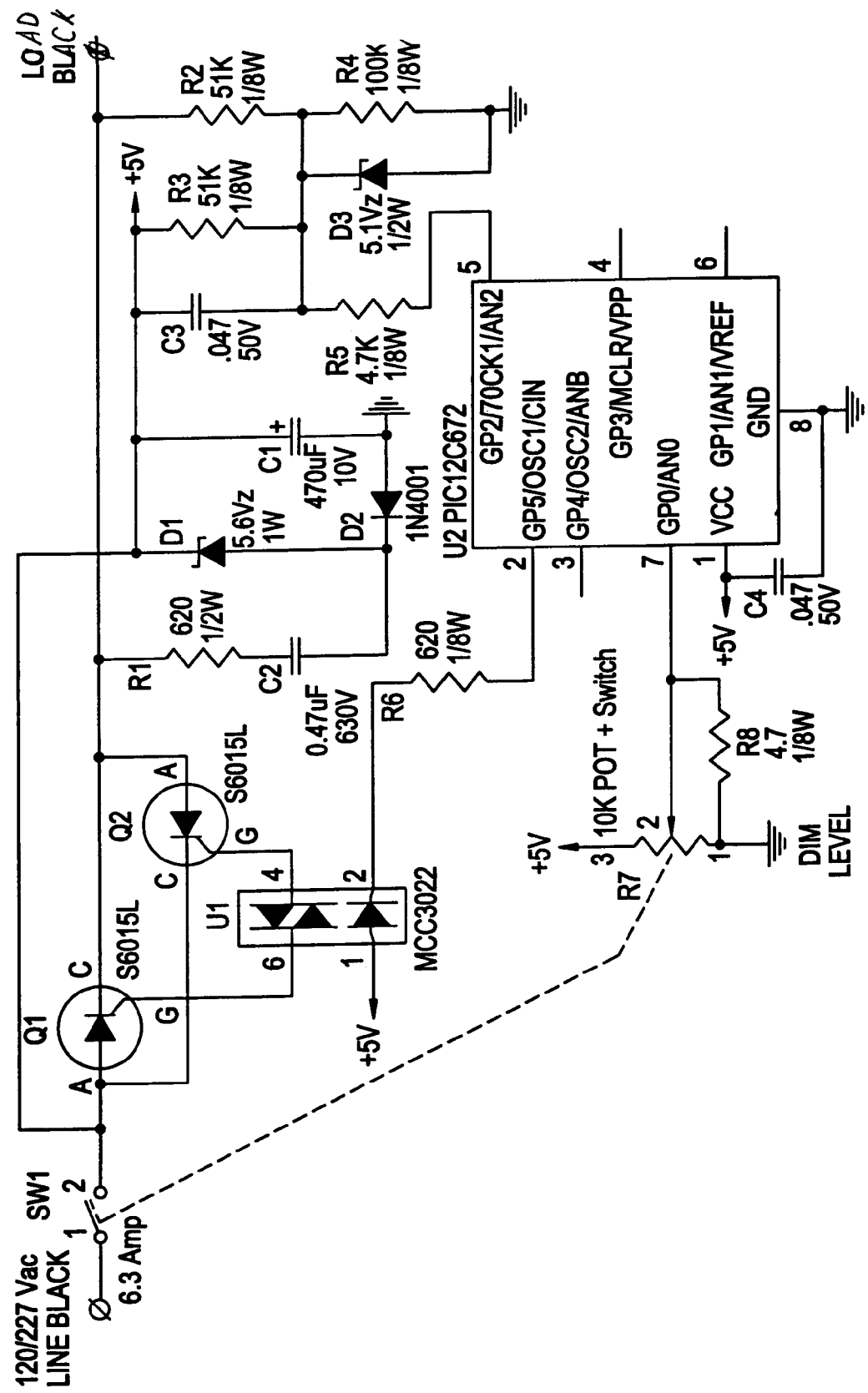
FIG. 4 is a schematic circuit diagram of an energy savings device according to the first embodiment of the invention.

A universal control device (or UCD) according to a first embodiment of the invention will be described below in detail. A block diagram of the UCD according to the first embodiment is shown in FIG. 3, and a schematic circuit diagram of the UCD according to the first embodiment is shown in FIG. 4.

The UCD according to the first embodiment includes a "push" On/Off switch and potentiometer unit 310 that is coupled to a line input (AC input voltage) 305, a solid state switch unit 320, a driver 330 for driving the solid state switch unit 320, a power supply 340, a microprocessor 350, and a line synchronization detector 360. The solid state switch unit 320 is provided between the line input 305 and the load 365. The switch and potentiometer unit 310 includes a "push" On/Off switch SW1 and a potentiometer POT. The line synchronization detector 360 provides an interrupt signal to the microprocessor 350, which corresponds to "rising" zero crossing of a load current waveform, to be explained in more detail below.

The UCD is a two wire dimmer unit, and can be utilized to control standard magnetic fluorescent fixtures. The UCD may also be used to control other resistive, inductive or capacitive (e.g., standard electronic fluorescent fixtures) loads. The UCD functions similar to incandescent dimmers, but it also implements line synchronization functions and timing functions (not done by incandescent dimmers) to allow it to control fluorescent fixtures and/or other types of reactive or capacitive loads. In a preferred configuration, the UCD is wired in series with the fluorescent load without observance of wiring polarity, in either the hot or return side of the load, in a manner that is identical to a standard single pole wall switch. In fact, the UCD is configured so as to replace any existing wall switch to provide a dimming functionality.

In a preferred implementation of the first embodiment, the UCD implements an 8-bit digital microprocessor 350 (of course, other types of microprocessors, such as 16-bit, 32-bit, etc., may be utilized instead of an 8-bit microprocessor, while remaining within the scope of the invention) with embedded firmware control algorithms for minimum parts count, and highly stable operation. The UCD according to the first embodiment is compatible with any configuration of magnetic ballast or electronic ballast fluorescent and/or incandescent loads. In a preferred construction, unit size, costs, producibility, performance and stability are optimized through the use of advanced digital and mass production techniques. Other embodiments to be described later include occupancy sensing, ambient light correction, and AC line modem for communication with a remote-Energy Management System. All of the embodiments to be described herein are "in series", two wire devices (see FIG. 1B or FIG. 2).

Table 1 provides line specifications of the UCD according to a preferred implementation of the first embodiment of the invention. One of ordinary skill in the art will recognize that other line specification ranges may be handled by the UCD according to the first embodiment, while remaining within the scope of the invention.

TABLE 1

Line Specifications

| | |
|---|---|
| Voltage | 110/277 Vac |
| Frequency | 50/60 Hz |
| Load Current | 6.3 Amps Maximum |
| Load/Watts | 750 Watts Maximum |
| Power Factor | 0.87–0.90 (full power) |
| THD | <35% (full power) |
| EMI/RFI | FCC Part 18 |

The UCD according to the first embodiment provides AC line synchronization and timing firmware algorithms used to provide stable dimming control of an inductive and/or resistive and/or capacitive load without regard to applied line voltage, frequency, and without requiring a specific connection to the AC Line Return or Safety Ground. The UCD according to the first embodiment implements phase control of the load, and also strategically controls the switching element turn-on timing for stable (non-flickering) control of inductive or resistive loads. The UCD according to the first embodiment synchronizes on the load current zero crossing, which causes a turning off of the series switching elements making up the solid state switch unit 320.

Highly inductive or resistive loads, such as magnetic fluorescent ballasts, cause a significant phase shift (delay) of the load current waveform relative to the applied voltage waveform, greatly complicating stable synchronization. This phase shift varies depending on the specific installation (number of fixtures and specific ballast specifications) as well as the selected dimming level. As the dimming level is varied, or fluorescent tube temperature changes, the current zero crossing synchronization signal to the microprocessor will move significantly in real time, causing a shift in phase timing for the next cycle. Unless a suitable phase timing algorithm is implemented, the light fixture will flicker in an oscillatory way, resulting in unstable (highly unsatisfactory) dimming. The inventors of this application realized that standard incandescent dimmers will not reliably function with fluorescent or other types of reactive loads due to their simplistic line synchronization methods. The timing correction algorithms utilized in the present invention are an important aspect of the UCD design according to the first embodiment (as well as to the other embodiments), and are described in detail below. Also, the UCD according to the present invention also performs well as a dimmer control with little or no flickering, for an electronic fluorescent ballast, which is a capacitive load.

Figure 5:
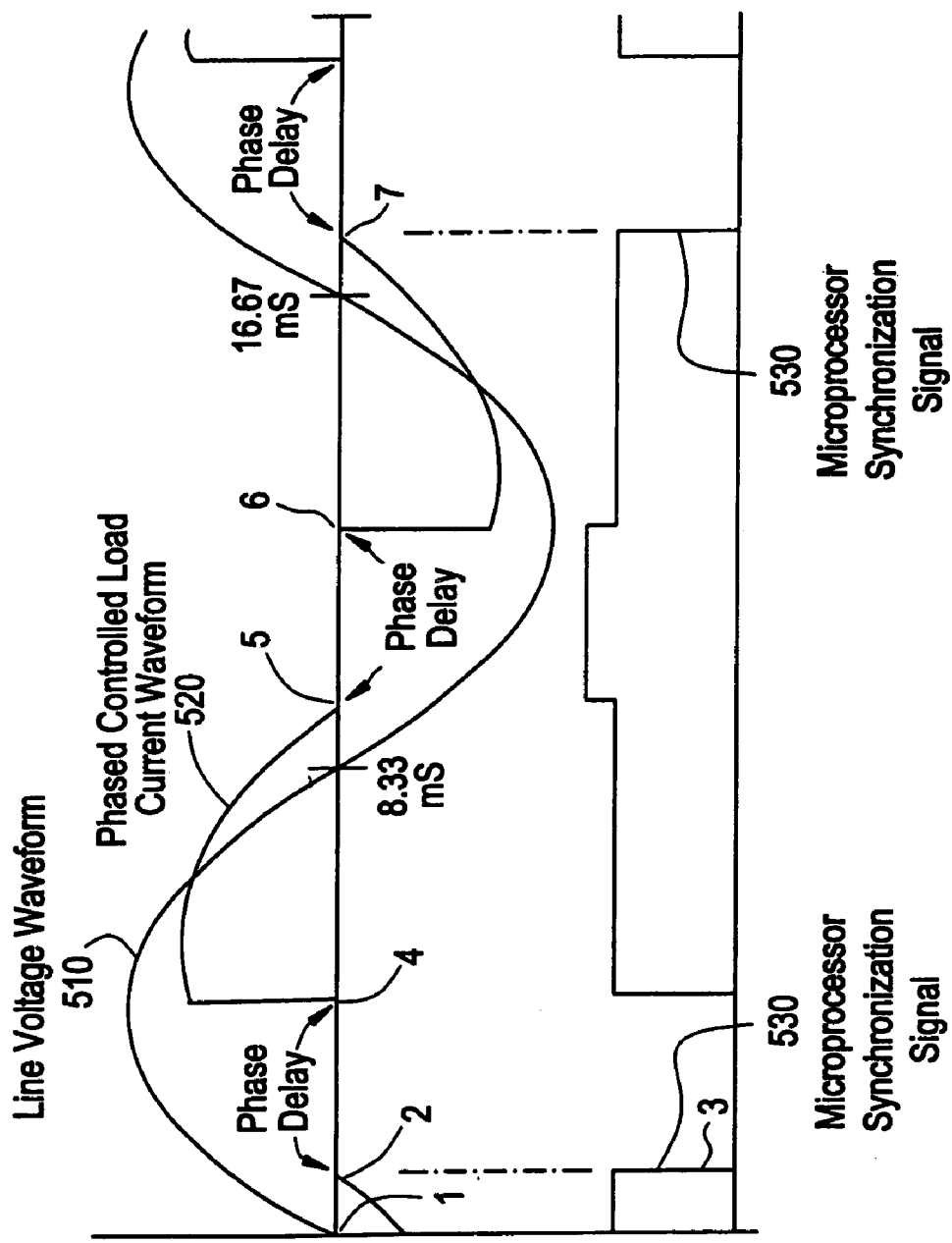
FIG. 5 shows phase control waveforms according to the first embodiment of the invention.

FIG. 5 shows the applied line voltage waveform, the dimmed fluorescent load current waveform, and the microprocessor synchronization waveform as implemented by the UCD according to the first embodiment. Also shown in FIG. 5 are seven (7) time points in a single cycle of the applied line voltage waveform (60 Hz or 16.67 msec time period for one cycle), each of which is discussed in detail below. The highly inductive nature of a fluorescent magnetic ballast causes the load current to lag the applied line voltage, as seen in the comparison of the AC line voltage waveform 510 with the load current waveform 520. The amount of lag depends on the circuit inductance, specific ballast design factors, tube striking voltage which is affected by tube temperature, and the amount of dimming phase delay being applied by the UCD according to the first embodiment. A point by point discussion of the seven labeled time points in FIG. 5 follows, with reference to the circuit elements shown in FIG. 4.

Time point 1 corresponds to the rising zero crossing of the applied line voltage waveform 510.

Time point 2 corresponds to the turn off point of Silicon Controlled Rectifier (SCR) Q2 from the previous dim cycle. An SCR turns off when the applied current through it reaches zero. Once the SCR turns off, the voltage across the SCR rises sharply.

At time point 3, the turning off of SCR Q2 causes the synchronization signal on pin 5 of the microprocessor U2 to go low, which interrupts the microprocessor U2. In the preferred implementation of the first embodiment, microprocessor firmware is initialized to only respond to the falling edge of the interrupt, and is used to derive all phase control timing for an entire line cycle. As the UCD dimmer potentiometer R7 is rotated clockwise, the period of phase delay time between time point 3 and time point 4 of FIG. 5 is increased, causing the fluorescent light fixture being controlled by the UCD to dim. Conversely, counterclockwise rotation of the UCD dimmer potentiometer R7 decreases this phase delay time, thereby causing the fluorescent light fixture light output amount to intensify.

The inventors have found through experimentation that a typical fluorescent tube with magnetic ballast goes off (no light output by it) at approximately 120 degrees (about 5.5 mseconds) of phase delay. This is due to insufficient tube ionization caused by insufficient tube heater output. Without adequate tube ionization, the tube strike voltage exceeds that available from the AC line. The inventors have also found that they were not able to visibly discern a change in light output until the phase delay reached about 15 degrees (about 0.7 mseconds) of phase delay. The half-intensity point was about 90 degrees of phase delay (about 4.17 mseconds).

Microprocessor control of the phase delay controls the dim level of the fluorescent fixture (the load). In response to the falling edge of the synchronization interrupt, the microprocessor U2 resets a free-running internal hardware timer (not shown in the figures) to zero, then waits for the timer to reach the phase delay value corresponding to the current position of the UCD dimmer potentiometer R7. In a preferred implementation, the UCD dimmer potentiometer R7 is coupled to a rotatable dial that is disposed on a wall of a building, whereby, when a user rotates the dial, the resistance of potentiometer R7 changes accordingly. The change in the resistance of potentiometer R7 is discerned by the microprocessor U2, which then computes a different phase delay value for a next AC voltage waveform cycle based on the new dimmer setting.

After the calculated phase delay time corresponding to time point 4 is reached, the microprocessor U2 triggers the SCR Q1 on by bringing pin 2 of the microprocessor U2 low for a short period of time. In the preferred construction, an opto-isolated triac U1 is used to trigger the SCR on while isolating the microprocessor U2 from possible damaging transients. Once the SCR Q1 is triggered on and current begins to flow, SCR Q1 will latch itself on until current reaches zero during the next half cycle. Current flow through the load continues whenever the SCR Q1 or the SCR Q2 is triggered on. When the SCR triggers on, the synchronization signal 530 goes high again. The rising edge of the synchronization signal 530 is ignored by the microprocessor U2, which only reacts to a falling edge of the synchronization signal 530 (due to microprocessor firmware that allows interrupts only on the falling edge of a signal provided to its interrupt port).

Time point 5 corresponds to the next zero crossing of the load current waveform 520. At this point, the SCR Q1 turns off. Unlike the occurrence at time point 2, no synchronization signal occurs at time point 5. This is because the microprocessor 5V supply voltage (input line voltage) 340 is negative (it is a floating supply), and the open fluorescent circuit (that is, the load) is roughly ground. The synchronization signal 530 actually rises slightly (few tenths of a volt) after time point 5, because the "grounded" fluorescent circuit is actually higher in voltage than the microprocessor negative 5V power supply 340. Microprocessor firmware is provided such that no microprocessor interrupt is generated from this slight perturbation of the synchronization signal 530 (and also since it does not correspond to a voltage drop but rather a voltage rise).

Phase control for the latter half-cycle of the AC line voltage waveform 510 is derived from the previous earlier half-cycle interrupt. The microprocessor U2 measures the applied line frequency and computes the number of internal free-running hardware timer counts that it has to wait for before triggering the SCR on for this latter half-cycle. The timer counts for a time period corresponding between the time between time point 5 and time point 6.

At time point 6, the SCR Q2 is triggered on. At time point 6, the voltage of the synchronization signal 530 drops slightly (a few tenths of a volt). No microprocessor interrupt is generated here either, due to the microprocessor firmware being configured to not cause an interrupt for such a small voltage drop. Again, the SCR Q2 remains on during the negative half cycle, until the circuit current reaches zero.

At time point 7, the rising load current waveform 520 again reaches zero. Again the synchronization signal 530 goes to zero, which causes a microprocessor interrupt (since it is a falling edge of the synchronization signal 530). This also causes a resynchronization of an internal free-running timer of the microprocessor U2, and results in another phase delay cycle similar to the one that was described above with respect to the time point 2 and time point 3.

The UCD hardware design according to a preferred configuration of the first embodiment includes the components illustrated in the FIG. 4 schematic diagram. A brief description of each hardware component, and its applied function, is provided below.

The microprocessor U2 (which corresponds to microprocessor 350 of FIG. 3) provides the control functions and algorithms for the UCD according to the first embodiment based on an internally stored firmware program. By way of example and not by way of limitation, in a preferred implementation, a MICROCHIP™ 12C672 eight bit microprocessor incorporates 2 kilobytes programmable read only memory (PROM) for program storage, 128 bytes random access memory (RAM), an eight bit timer, 4 channel 8 bit Analog to Digital (A/D) converter, 4 MHz oscillator, and reset circuit in a very space efficient 8 pin package. More details on this microprocessor can be found at the Internet web site www.microchip.com. Of course, one of ordinary skill in the art will understand that other types and sizes of microprocessors may be utilized for the microprocessor to used in the first embodiment, while remaining within the scope of the invention.

Since the functionality of the microprocessor U2 exists internally, in a preferred implementation, six I/O pins may be allocated to either digital inputs and outputs or analog inputs. Two pins are reserved for +5 volt power and ground. By way of example and not by way of limitation, an Analog to Digital input impedance is approximately 10K ohms.

By way of example and not by way of limitation, the "push" on/off potentiometer switch SW1 is rated for the 6.3 ampere maximum dimming capacity. When turned off, the dimmer/load is entirely open circuited, resulting in no current flow to the load. Rotating potentiometer R7 and switch SW1 are preferably integrated into a single unit. Pushing the adjustment shaft of potentiometer R7 will cycle switch SW1 on and off. Potentiometer R7 is wired as an adjustable voltage divider, whereby rotating the shaft of potentiometer R7 adjusts the voltage at pin 7 of microprocessor U2. The microprocessor U2 reads the voltage at its pin 7 once every AC line cycle, and uses this voltage to derive the amount of phase delay (dim level) for the load. Resistor R8 is wired between the potentiometer wiper and ground, and is used to provide a more linear relationship between the potentiometer position and resulting dim level. By way of example and not by way of limitation, resistor R8 has a resistance of 4.7 kohms.

In the preferred implementation of the UCD according to the first embodiment, two SCRs Q1, Q2 are connected back to back to provide an active switching element for the UCD, and correspond to the solid state switch 320 of FIG. 3. The inventors found that TRIAC devices do not trigger as accurately as back-to-back SCRs when switching a highly inductive resistive load. Consistent and accurate switching element turn-OFF at the current zero crossing is very important to line synchronization. The use of a TRIAC as the active element may result in occasional flickering, which may be due to an unstable holding current level. As a result, the inventors found that an active element that includes back-to-back SCRs functions much better than one having a TRIAC in the energy savings device according to the invention, whereby using two SCRs provides an increase in switching current capability and better heat distribution to a heat sink.

By way of example and not by way of limitation, the SCRs utilized in a preferred implementation of the first embodiment are 600V, 15 ampere devices. The SCRs Q1, Q2 are designed to run very cool at maximum specified loads. The choice of which type of SCRs to use in the first embodiment may also be made based on a low holding current parameter for the SCRs. When a signal of either polarity triggers the opto-isolated triac U1, positive pulses from pin 4 and from pin 6 of the opto-isolated triac U1 are transmitted to gates (G) of the SCRs Q1, Q2, respectively. Opto-isolated triac U1 of FIG. 4 corresponds to solid state driver unit 330 shown in FIG. 3.

SCRs conduct current in one direction (from anode to cathode), with back-to-back SCRs having the capability to conduct in both directions. SCRs are latching devices, meaning that once they are trigger on, they will continue conducting until the anode-to-cathode current through them reaches zero (or reverses direction). An SCR is triggered on by pulling current out of its Gate pin, or bringing the Gate voltage a few volts lower than its anode pin. The holding current specification for an SCR specifies the minimum SCR current necessary for the SCR to latch on, and to remain latched on. A holding current on the order to 20 milliamperes is needed for proper operation of a typical SCR. Once the SCR current drops below the specified holding current, it will turn off until retriggered again. Only the SCR with its anode voltage positive relative to its cathode voltage is capable of being triggered on. This means that SCR Q1 controls the load during the positive half of the AC voltage waveform cycle, and SCR Q2 controls the load during the negative half of the AC voltage waveform cycle.

As shown best in FIG. 4, the opto-isolated triac U1 is used to trigger the SCRs Q1, Q2. The microprocessor U2 triggers opto-isolated triac's U1 internal triac, and subsequently one or the other SCR Q1, Q2, by illuminating the opto-isolated triac's U1 internal light emitting diode (LED). LED illumination occurs when the microprocessor U2 pulls its output pin 2 low, resulting in LED forward current. The opto-isolated triac U1 is capable of conducting current in either direction, depending on the relative voltages of pins 4 and pin 6 of the opto-isolated triac U1. For example, if pin 6 is higher than pin 4 of the opto-isolated triac U1, current will flow from pin 6 to pin 4. Connecting the opto-isolated triac U1 between the gates of the two SCRs Q1, Q2 provides a convenient method of triggering back-to-back SCRs.

Current flows into pin 6 of the opto-isolated triac U1 and out pin 4 in response to the positive half of the AC sine wave voltage waveform 510 (see FIG. 5) and vice versa in response to the negative half of the AC sine wave voltage waveform 510. Pulling current out of the associated SCR gate turns the device on. The internal structure of the SCR allows current to flow into the gate of the opposite device without triggering the device. Therefore, SCR Q1 will remain latched through the positive half of the sine wave current, whereupon at approximately zero crossing, the latching current will be insufficient and SCR Q1 will switch off. Similarly, the gate of SCR Q2 will source current into pin 4 of the triac U1 and out pin 6 of the triac U1 during negative half of the AC cycle, and remains latched again until approximately zero crossing. This switching sequence repeats for each cycle of the AC sine wave voltage waveform 510, providing full power of sine wave current to the (fluorescent) load. Accurate and stable triggering of the SCRs Q1 and Q2 are very important to the suppression of flickering.

Back-to-back SCRs are used to form an active element of an energy savings device according to a preferred implementation of the first embodiment since they were found by the inventors to be somewhat more stable in their turn OFF characteristics than a TRIAC. In order for an SCR to latch on, the anode/cathode current must exceed the latching current requirement. Once it is latched on, an SCR will remain on until it is turned off when anode/cathode current drops below holding current requirement. With such features, SCRs are ideal devices to be utilized for the active element that corresponds to the solid state switch 320 (see FIG. 3) of the UCD according to the first embodiment. One of ordinary skill in the art will recognize that other types of solid state switches may be utilized, as well as switch drivers, beyond the ones described herein, while remaining within the scope of the invention.

In the preferred implementation of the first embodiment, the opto-isolated triac U1 is utilized to provide driving signals to the SCRs Q1, Q2. By way of example and not by way of limitation, the opto-isolated triac U1 may be a MOC3022 opto-isolated triac, which drives the Q1 and Q2 gates and provides line transient protection to the microprocessor U2. A LED drive current of approximately 5 milliamps (via resistor R6, which is a 620 ohm resistor in the preferred implementation) is sufficient to reliably trigger the opto-isolated triac U1. The GP5 pin of microprocessor U2, which corresponds to pin 2 of the microprocessor U2, is configured for output and is capable of sinking up to 20 milliamps.

Referring to FIG. 5, the opto-isolated triac U1 outputs a drive signal starting at time point 6, whereby the drive signal is turned off well before the load current zero crossing at time point 7. Also, the opto-isolated triac U1 outputs a drive signal starting at time point 4, whereby the drive signal is turned off well before the load current zero crossing at time point 5.

Referring to FIG. 4, resistor R2 is a current limiting resistor, and is provided so as to limit the series current of the opto-isolated triac U1 to be less than one ampere under all circumstances. For 277 VAC installations, the value of resistor R2 should preferably be increased to 470 ohms due to the increase in the AC waveform voltage level.

In a preferred implementation of the first embodiment, the SCR trigger signal output by the optoisolated triac U1 stays on for approximately 1.2 milliseconds. The actual SCR trigger signal on time is not critical, since an SCR triggers on within a few microseconds of receiving a trigger signal to its gate. In a preferred implementation, and as explained above, the SCR trigger signal turns off before the next zero crossing of the load current waveform, in order to enforce some SCR off time (e.g., 0.25 milliseconds). This off time is provided in order to recharge the 5 volt power supply 340 (see FIG. 3) for the next cycle.

Resistor R1, capacitors C1, C2, diodes D1 and D2, and the 5 volt power supply of FIG. 4 are all utilized for a power supply control for the UCD according to the first embodiment, and together form the power supply unit 340 shown in FIG. 3. In a preferred implementation, the 5 Volt power supply 340 provides up to 20 millamps of power to the microprocessor U2, opto-isolated triac U1, and the potentiometer R7 at all times in which the UCD is powered. The 5 Volt power supply 340 floats with the AC line input. Voltage is derived by the widely varying voltage across SCRs Q1 and Q2. Power is available to the circuit only when SCRs Q1 and Q2 are switched OFF. When SCRs Q1 and Q2 are turned on, the 5 Volt supply 340 is maintained by capacitor C1 and is stabilized by zener diode D1. Silicon Diode D2 provides a discharge path for capacitor C1. Resistor R1 and capacitor C2 provide an AC coupled voltage drop to limit silicon diode D1 and zener diode D2 current and dissipation. By way of example and not by way of limitation, the microprocessor U2 remains entirely functional with any supply voltage over 3.3 Volts at a current of 3 milliamps. In a preferred implementation of the first embodiment, supply regulation is not critical as long as the supply voltage maintains the 3.3V minimum.

Resistors R3, R2, R4, R5, and diode D3 of FIG. 4 are elements making up the Line sync unit 360 shown in FIG. 3. The falling half of the AC line output (when SCRs Q1 and Q2 turn off) is used for line synchronization. SCRs Q1 and Q2 turn off at the line current zero crossing. Zener diode D3 protects the microprocessor interrupt input (port 5 of the microprocessor U2) against unforeseen line and switching transient spikes. Resistor R5 limits current input to the microprocessor U2 and allows the internal microprocessor protection or clamp diodes to function while preventing any possible burnout. Resistors R2, R3 and R4 also provide a current limiting and line synchronization function for the UCD.

The inventors have realized that stable AC line synchronization is very important to non-flickering operation when controlling inductive and/or resistive loads (especially conventional Magnetic Ballast Fluorescent Fixtures), and even for controlling capacitive loads (such as Electronic Ballast Fluorescent Fixtures). These synchronization methods are implemented in the firmware of the microprocessor U2 according to the first embodiment, and are applicable to the other embodiments as well.

The microprocessor firmware provides a Line Sync Edge Detection function. In detail, the microprocessor U2 is interrupted on the falling edge of Line Syncronization signal 530 (see FIG. 5) which occurs once every AC cycle as the switching element turns off at the current zero crossing. SCRs have a characteristic in that they latch themselves on until the current through them reaches zero. The point where they turn off is used as the line synchronization. An internal timer of microprocessor U2 is initialized at this interrupt, and timing parameters for the next entire AC cycle calculated in firmware. Using a single current zero crossing per AC cycle cancels any non-uniformity of the positive and negative halves of the current waveform, as well as eliminates interrupt input threshold hysteresis effects.

The firmware of microprocessor U2 also provides an AC Line Period Determination function. In detail, at initial power up, the microprocessor performs a timing analysis of the AC line with the load switched off so that specific timer counts for each half phase may be calculated. Leaving the load off during this period provides a very accurate measurement of the AC line voltage, without inductive load phase shift influence. At the first interrupt after initial power up, the microprocessor timer is initialized to zero. At the next interrupt the timer value is stored, representing the number of timer counts for a full AC cycle. Subsequent phase timing parameters are derived from this number. Intra-interrupt timing functions are driven by waiting for specific timer counts.

The microprocessor firmware also performs a Phase Timing Calculation function. In detail, once the line period has been determined, the firmware of microprocessor U2 performs phase timing calculations. Since synchronization is performed only once per AC cycle, a determination of the cycle half time is made by dividing the period by two (shift right one time). Next, a calculation of when the cycle is completed (cyclendtime) in anticipation of the next interrupt is made.

The firmware of microprocessor U2 further performs a Dead Time Implementation function. In detail, circuit power is only available when the series switching elements (SCRs) are turned off, therefore microprocessor firmware guarantees a minimum off time (deadtime) for each AC line half cycle to restore the 5 volt supply.

The firmware of microprocessor U2 also performs a Fixture Warmup function. In detail, fluorescent tubes should be fully warmed up before they can be reliably dimmed. This feature may not be desirable for other types of inductive or resistive loads, and may be easily deleted from the control device, without departing from the scope of the invention. To address this requirement, the fixture is set to full intensity for a first time period after initial power up. By way of example and not by way of limitation, the first time period is set to 12 seconds. Upon completion of the 12 second period, the intensity is returned to the dim level corresponding to the position of potentiometer R7 (see FIG. 4).

The firmware of microprocessor U2 further provides a Sync Window Implementation function. In detail, in order to reject spurious line transients which could possibly upset dimmer timing, a sync window algorithm is utilized in the first embodiment. At the end of each full AC cycle, the microprocessor U2 waits until cyclendtime which occurs a few timer counts before the next line interrupt, before re-enabling interrupts. If a spurious interrupt occurred between the last sync edge and cyclendtime, it is effectively ignored.

The firmware of microprocessor U2 also provides a Slow Phase Timing (Dim Level) Changes function. In detail, when using a current zero crossing sync with an inductive magnetic ballast, any phase timing (dim level) change causes a slight synchronization variance which could cause instability (flickering) if not greatly damped out. To greatly lessen this possibility, phase timing changes are limited to one timer count per AC cycle, thereby minimizing this effect.

The firmware of microprocessor U2 further provides a function for pulsing the SCRs ON at the correct time. In detail, the SCRs Q1, Q2 are pulsed on, instead of just turned on and left on at the proper time, to reduce the drain on the 5 Volt power supply 340 (see FIG. 3).

More details of the microprocessor firmware implementation according to a preferred implementation of the first embodiment is provided in detail below. In the preferred implementation, the firmware of microprocessor U2 is written using a Microchip assembler language specific to the 12C672 eight bit microprocessor. Of course, based on the type of microprocessor utilized in the first embodiment, the choice of software language used to write the microprocessor firmware will be utilized accordingly.

Figure 6A:
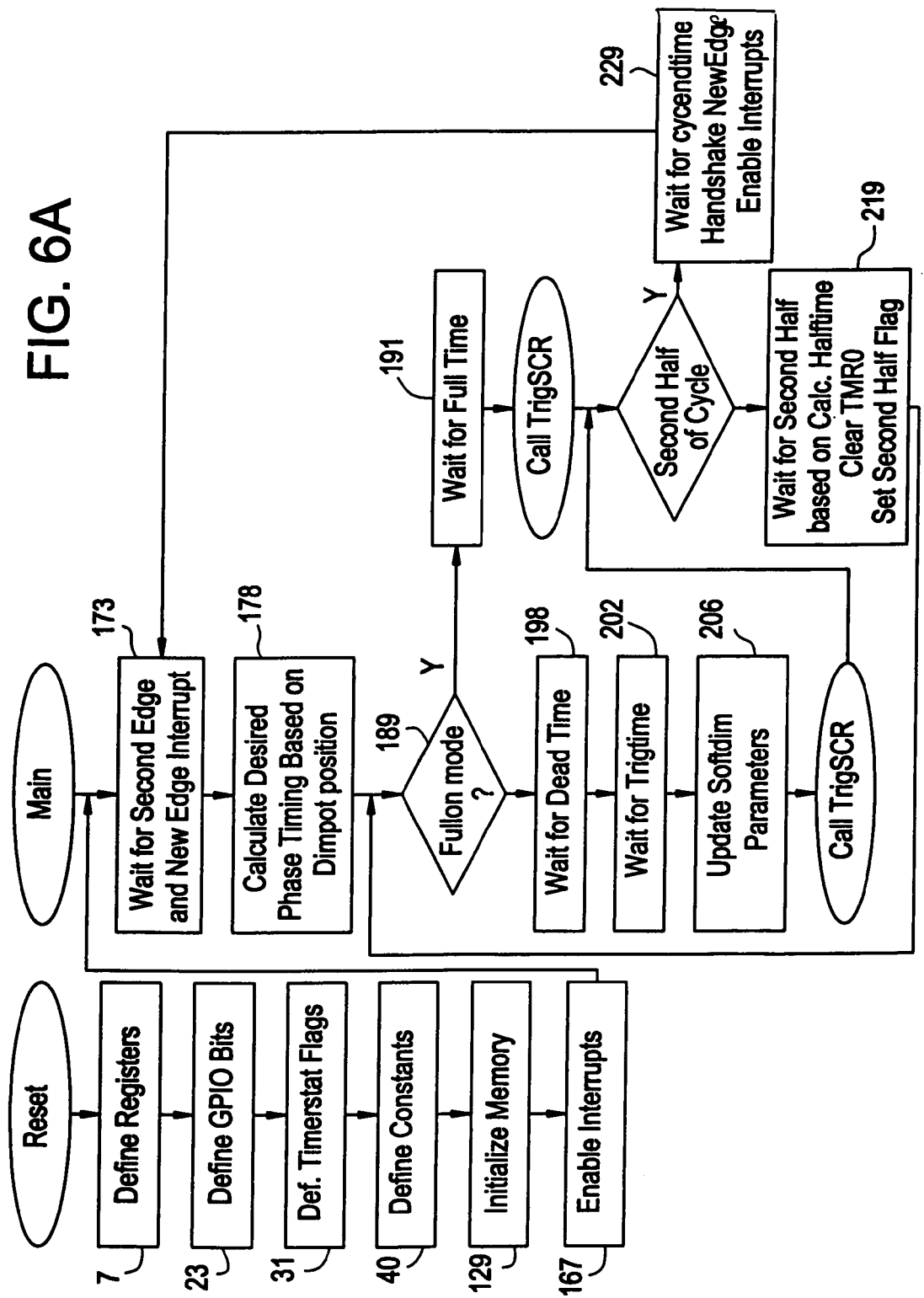
FIG. 6 is a software flow diagram of microprocessor firmware that operates according to the first embodiment of the invention.
Figure 6B:
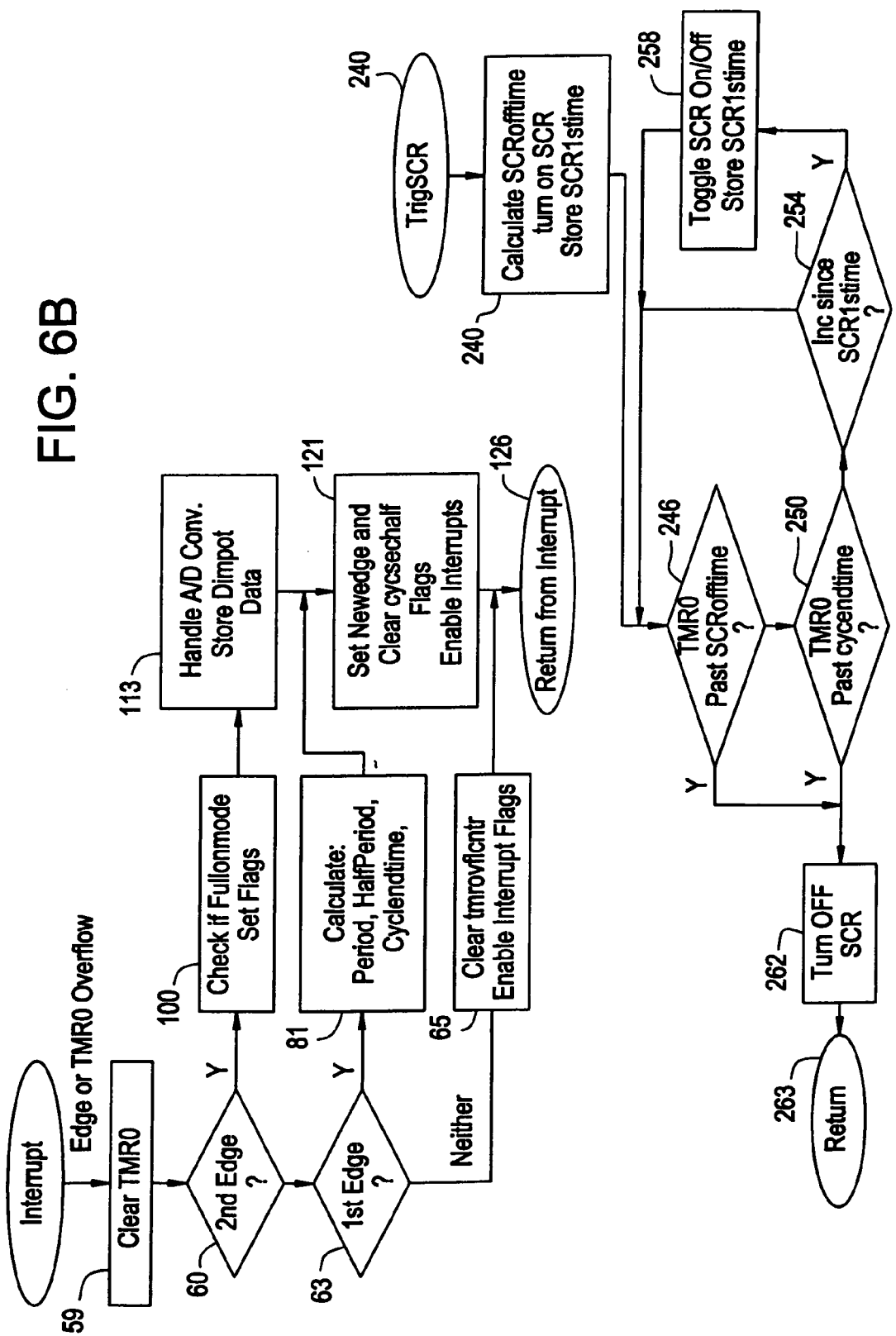

A detailed flow chart of the preferred implementation of microprocessor firmware to be utilized by a microprocessor U2 according to the first embodiment of the UCD is illustrated in FIG. 6. Major flow chart function descriptions are provided below.

For UCD implementation, a Reset occurs only during initial power up. At this time, microprocessor memory and register contents are random, and are thereby initialized before they can be used. In the preferred implementation of the first embodiment, the microprocessor U2 has an internal reset circuit which recognizes when power is initially applied. Upon Reset, the microprocessor U2 begins execution at address 0000, which is where the initialization firmware starts. Once this initialization executes, it is not re-executed unless another power up sequence occurs.

Two interrupts are enabled for the UCD according to the first embodiment. First, the external synchronization falling edge interrupt, from which all phase delay calculations are derived, is enabled. Second, the internal hardware free-running timer overflow interrupt is enabled. In the preferred implementation of the first embodiment, the timer is an 8 bit timer which is incremented once every 64 microseconds. The timer overflows every 16.384 milliseconds (256 counts), which is slightly less than a full 16.667 millisecond line cycle. During an interrupt, the microprocessor U2 stops executing where it is, saves it's state (e.g., processor status word and program counter), and executes interrupt code. Initial line parameter calculations, hardware timer maintenance, and Analog to Digital Converter (ADC) maintenance occurs during the interrupt firmware.

Referring to FIG. 6, "Main" is the start of the primary UCD software program run by the microprocessor U2. It is entered after initial power up initialization and once per complete line cycle. "Main" keeps track of the current line half cycle, and performs all phase timing calculations based on the free-running hardware timer. Phase timing is implemented by waiting for the appropriate free-running timer count to occur, then calling the TrigScr subroutine which implements the SCR trigger timing. Specific free-running timer values to wait for are calculated based on the following factors:

a) Dimpot position: As indicated by the converted ADC value. Rotating the dimpot potentiometer clockwise will reduce phase delay, and increase florescent intensity.

b) FullOnMode: During the first 12 seconds after initial power up, the UCD is in FullOnMode. During this time, the florescent load is forced into full intensity to warm the tubes. During FullOnMode, phase delay is fixed at the constant value fulltime. When not in FullOnMode, phase delay is calculated based on dimpot position, and results of the softdim calculation. The softdim calculation prevents large cycle to cycle phase delays from occurring. This provides a stabilizing effect on florescent intensity.

c) Cycle Half: After completion of the first half of the line cycle, firmware waits for the pre-calculated half period free-running hardware timer value, resets the timer, and jumps back to Main. This causes the second half cycle phase delay timing to be identical to the first half cycle. At the end of the second half cycle, firmware will wait for the free-running hardware timer to reach the pre-calculated cyclendtime, then re-enable interrupts in anticipation of the next full line cycle.

After the appropriate phase delay has be determined, a call to TrigScr is executed whereby the SCRs Q1, Q2 are turned on at the appropriate times.

The TrigSCR sub-routine toggles the SCRs Q1, Q2 on and off for a period of time to minimize drain on the 5V power supply. Once the SCR current is greater than the SCR specified holding current, it will latch on for the duration of the half cycle, until the current reaches zero again. Relative free-running hardware timer values are used to accomplish this pulse ON, pulse OFF, and pulse duration timing.

The following are descriptions of each section of the dimmer firmware utilized by the microprocessor U2 according to a preferred implementation of the first embodiment, whereby each section is identified by line number, then label and references to the flow chart of FIG. 6. Of course, other firmware may be utilized as would be recognized by one of ordinary skill in the art, while remaining with the scope of the invention.

Line 1: Defines the microprocessor as the target for the assembler

Line 2: This include file defines the microprocessor register names and memory mapped register addresses.

Line 5: A list of defined memory mapped addresses follows:
  dimpot: Storage of the dim potentiometer analog value
  timerstat: Mode Flags specific to dimming mode
  tmrovflcntr: Used as an overflow counter to the internal 8 bit counter TMR0
  intovflcntr; LSB of counter used for 12 sec full ON
  fullintcntr: MSB of counter used for 12 sec full ON
  timereg: Temp Storage of TMR0 Count
  periodmsb: Measured MSB of Full wave TMR0 Count
  periodlsb: Measured LSB of Full wave TMR0 Count
  halftime: Calculated TMR0 Count for Half Wave
  trigtime: Calculated TMR0 Count to Trigger SCR
  SCRofftime: Temp Storage where time to turn off SCR is stored each cycle
  SCRlstime: Temp Storage for Last SCR time . . . subsequent SCR ON/OFF functions key off of this stored TMR0 value
  cycendtime: Re-Enable Edge Interrupt time
  softlast: Temp Storage of last dim time count is stored. Used for Soft Dim Line 23 ;GPIO Bit Defs
  potanal 12C672 GPIO Pin Allocated to Potentiometer Analog Input
  gp1 12C672 GPIO Pin Not Used
  acint 12C672 GPIO Pin Allocated for AC Interrupt Input
  gp3 12C672 GPIO Pin Not Used
  gp4 12C672 GPIO Pin Not Used
  SCRdrv 12C672 GPIO Pin GPIO SCR Drive Output Line 31 ;TimerStat Bit Defs
  firstedg Flag: First Interrupt Edge Occured
  secedge Flag: Second Interrupt Edge Occured
  fullonmode Flag: Full on mode
  newedge Flag: New Edge Flag
  cycsechalf Flag: Second Half of Period
  oddedge Not Used in this Version Line 39 ;Value Defs
  intovflow=d'3' ;FullOnMode Int Overflows 4 Secs per inc
  dimofst=h'4' ;ADC Offset, Higher Numbers go Dimmer
  maxofst=h'7f' ;Maxdim Offset
  maxdima=h'fe' ;Maxdim Level
  maxdimlvl=h'd0' ;Maxdim
  intwindow=d'3' ;Interrupt Window
  SCRpulsetime=h'37' ;Time SCR is Pulsed ON and Off
  deadtime=d'8' ;Dead time past zero crossing
  fulltime=d'8' ;Full On-time-past zero crossing Line 54 rstvec The microprocessor starts execution at address 0 after Reset, Interrupts are disabled, then memory initialized Line 58 intvec The microprocessor interrupt vector for enabled interrupts is at address 4

Line 59 intsvc TMR0 is cleared at each falling edge of the AC interrupt. After a Reset, a wait for the zeroth edge is executed. Upon occurrence of the zeroth edge, TMR0 overflow interrupt is enabled so that the AC edge to edge period can be calculated. Upon occurrence of the first edge interrupt, AC parameters are calculated and used in subsequent phase calculations.

Line 61 Jump table based on edge occurrences

Line 65 notfirst Zeroth edge interrupt has occurred, enable TMR0 overflow Interrupts Line 72 firsthap First interrupt has happened, count number of TMR0 overflows, enable Next TMR0 overflow interrupt Line 78 notmrint If it's a second edge interrupt, then disable subsequent TMR0 overflow Interrupts, and then calculate AC timing parameters Line 81 caltime AC parameters such as period, halftime, and cyclendtime, are calculated once. Flag secedge is then set, and further edge interrupts enabled. From now on, each edge interrupt constitutes an AC line synchronization signal used for phase control of the SCRs Line 100 sechap Once the second edge interrupt has occurred, then 12 seconds of full on is executed to fully warm the tube heaters. Fullintcntr, and intovflcntr form a 16 bit counter which count 16.667 mS edge interrupts. A total of 768 edge interrupts provides a net 12.8 seconds of fluorescent tube full on time.

Line 112 fulldun Upon conclusion of the full on mode, the fullonmode flag is cleared in timerstat.

Line 113 notfull Each edge interrupt, the A/D converter is checked for conversion complete. If it has completed the dimpot value is inverted by exclusive Oring the input value and stored in the memory location dimpot.

Line 121 nocvrt A/D conversion has completed, another conversion is started. The newedge flag is set and the cycsechalf flag cleared, indicating to the main program code that an interrupt had occurred, and that it is now the first half of the AC cycle.

Line 123 glitint TMR0 is cleared, Edge interrupts are re-enabled, and a return from interrupt executed Line 129 initmem Microprocessor hardware registers are initialized, program defined registers are cleared, and finally edge interrupts are enabled.

Line 173 main Main part of the program. Wait for second edge interrupt. At this time, all AC line parameters have been calculated, and normal phase control can commence.

Line 175 main1 Wait for each new edge. Newedge is a handshake flag with intsvc which is used to wait for a new edge at the completion of each AC cycle.

Line 178 main2 Entered at the start of each AC cycle. Potentiometer scaling to actual TMR0 counts are performed once per AC cycle. Edge Interrupts are disabled, dimpot contains the commanded dim value. The memory location softlast is used to calculate the desired dim value time.

Line 189 sechalf This is the entry point for the second half of the AC cycle. If NOT in Fullonmode, then go to dimtrig. Else, it is fullonmode at sechala.

Line 191 secala A wait until TMR0=deadtime is executed. Deadtime defines the earliest time (in TMR0 counts) the SCR may be triggered ON after an AC line voltage zero crossing. A call to trigSCR turns the SCR on for a period of time. After returning, the first cycle half is complete.

Line 198 dimtrig Fullonmode has completed, enforce minimum deadtime limit, by waiting for TMR0 to reach deadtime value.

Line 202 dimwait Past deadtime, now wait for the calculated TMR0 value corresponding to the calculated phase delay for the indicated dim level. The memory location trigtime is incremented or decremented once each time, effectively "chasing" the desired dim level stored in softlast.

Line 217 hafcycl Halfcycle parameters are checked. If already in the second half, a wait for next edge interrupt (jump to rstcycle) is executed. If Not already in second half, a wait until the previously calculated Halftime TMR0 value is executed. Once past halftime, TMR0 is cleared, and the cycsechalf flag is set. Then a jump to sechalf occurs, duplicating timing parameters for the second half of the AC cycle.

Line 229 rstcycle Once timing for the second half of the AC cycle has been executed, a wait until cyclendtime is executed before edge interrupts are Re-enabled. This provides a window which rejects AC line transients which occur outside of the window. Upon passage of the window, Interrupts are re-enabled, and a jump to main1 is executed, causing a Wait for the next edge interrupt.

Line 240 trigSCR TrigSCR is a routine that is called when it's time to turn on the SCR. When called, the SCR is triggered on (SCRdrv is brought low), then the SCRofftime is calculated based on addition of the constant SCRpulsetime, and the current TMR0 value. A wait until SCRofftime is executed, whereupon the SCR is turned off (SCRdrv is brought high). If cycendtime occurs during the time trigSCR executes, drive to the SCR is deasserted, and a return to the calling code is executed.

Line 265 end End of the program.

Figure 7:
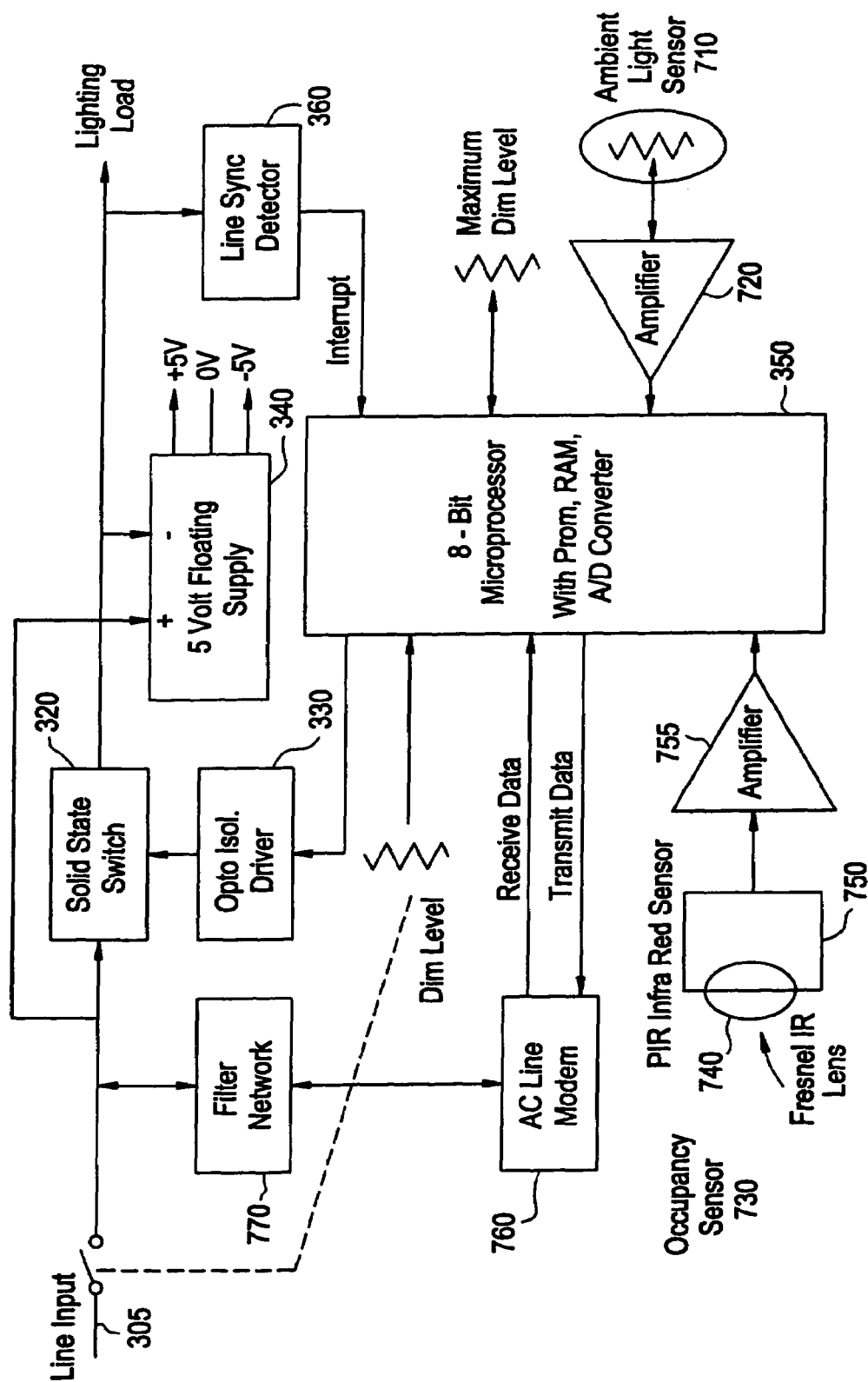
FIG. 7 is a block diagram of an energy savings device according to a second embodiment of the invention.
Figure 8A:
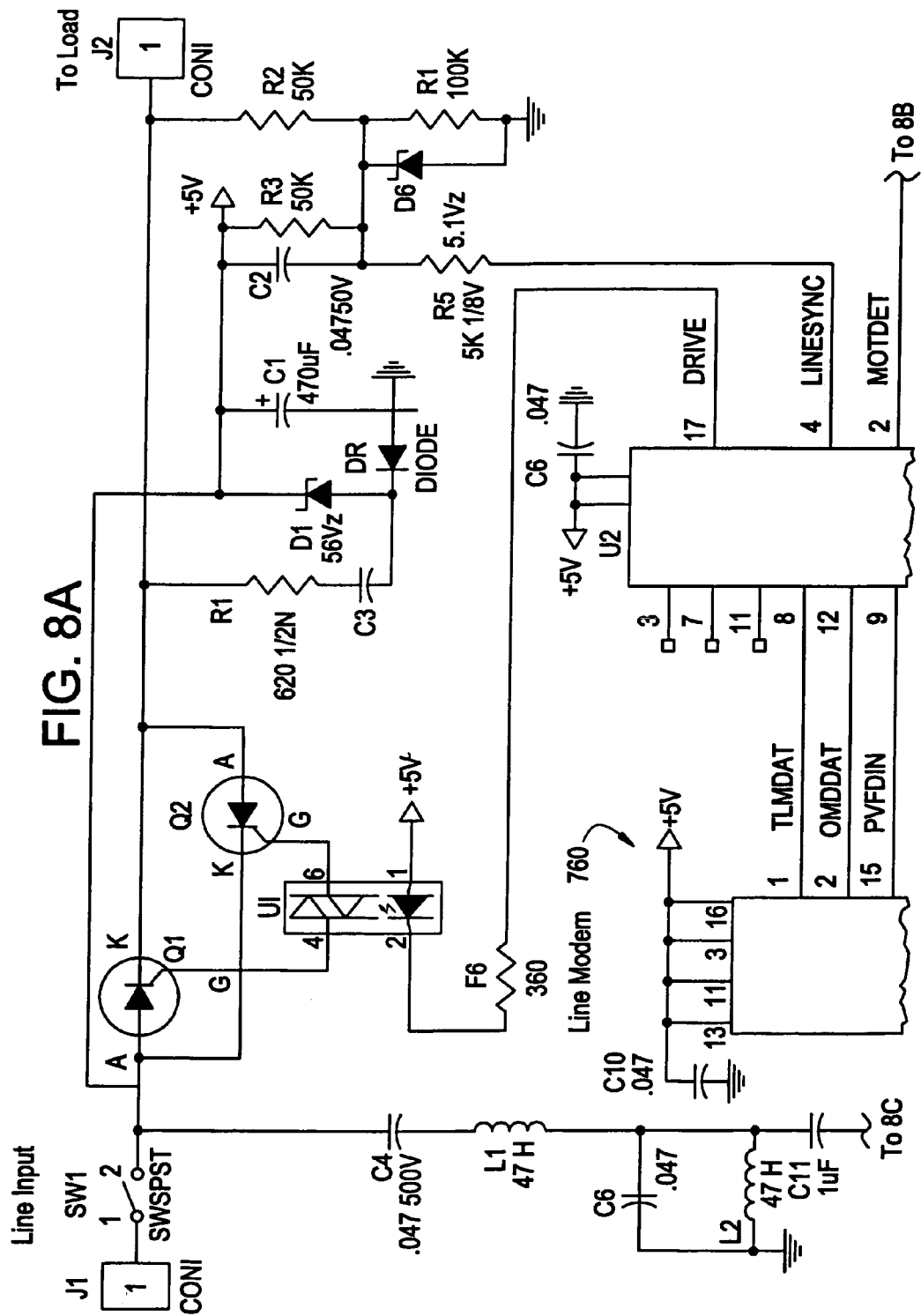
FIG. 8 is a schematic circuit diagram of an energy savings device according to the second embodiment of the invention.
Figure 8B:
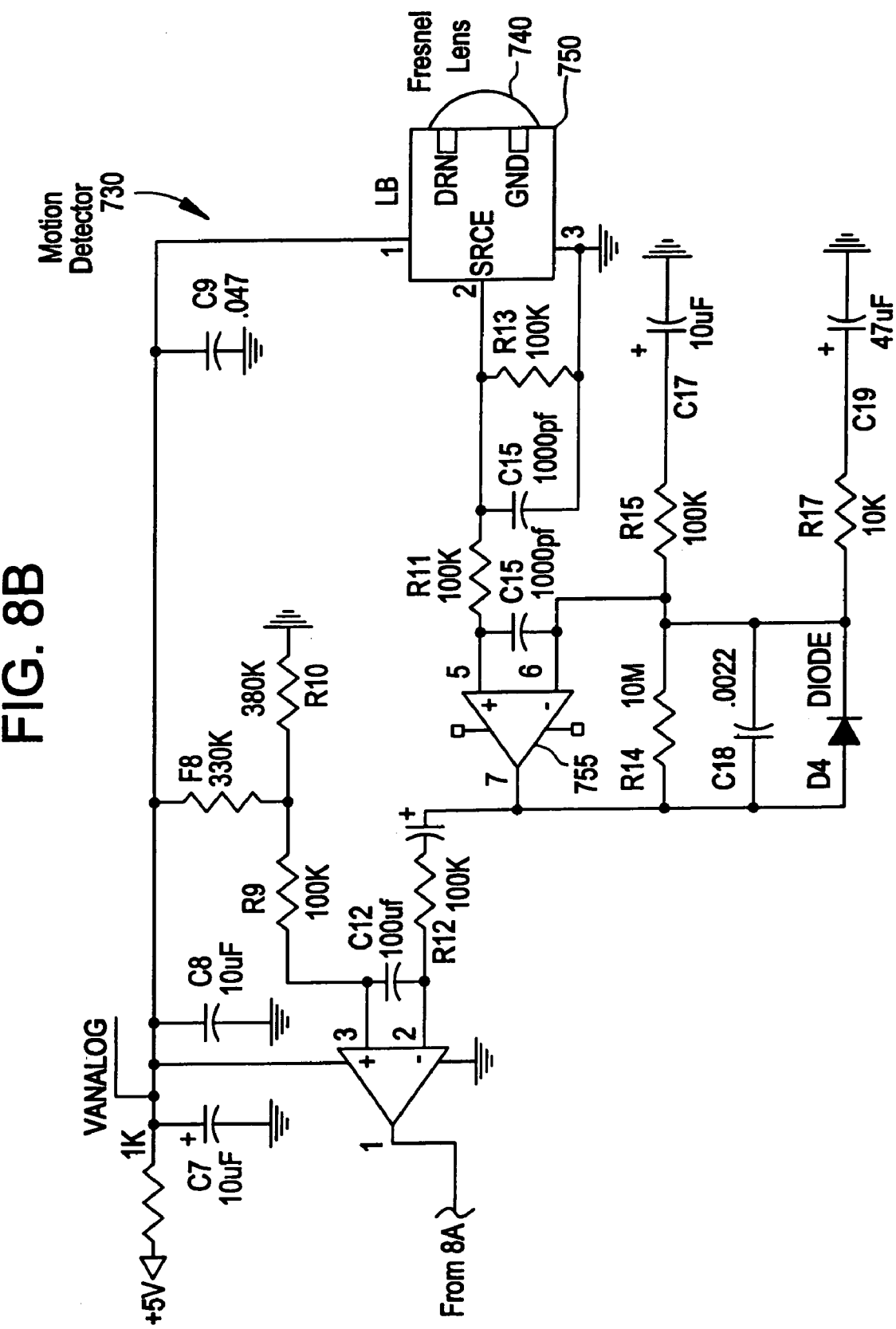
Figure 8C:
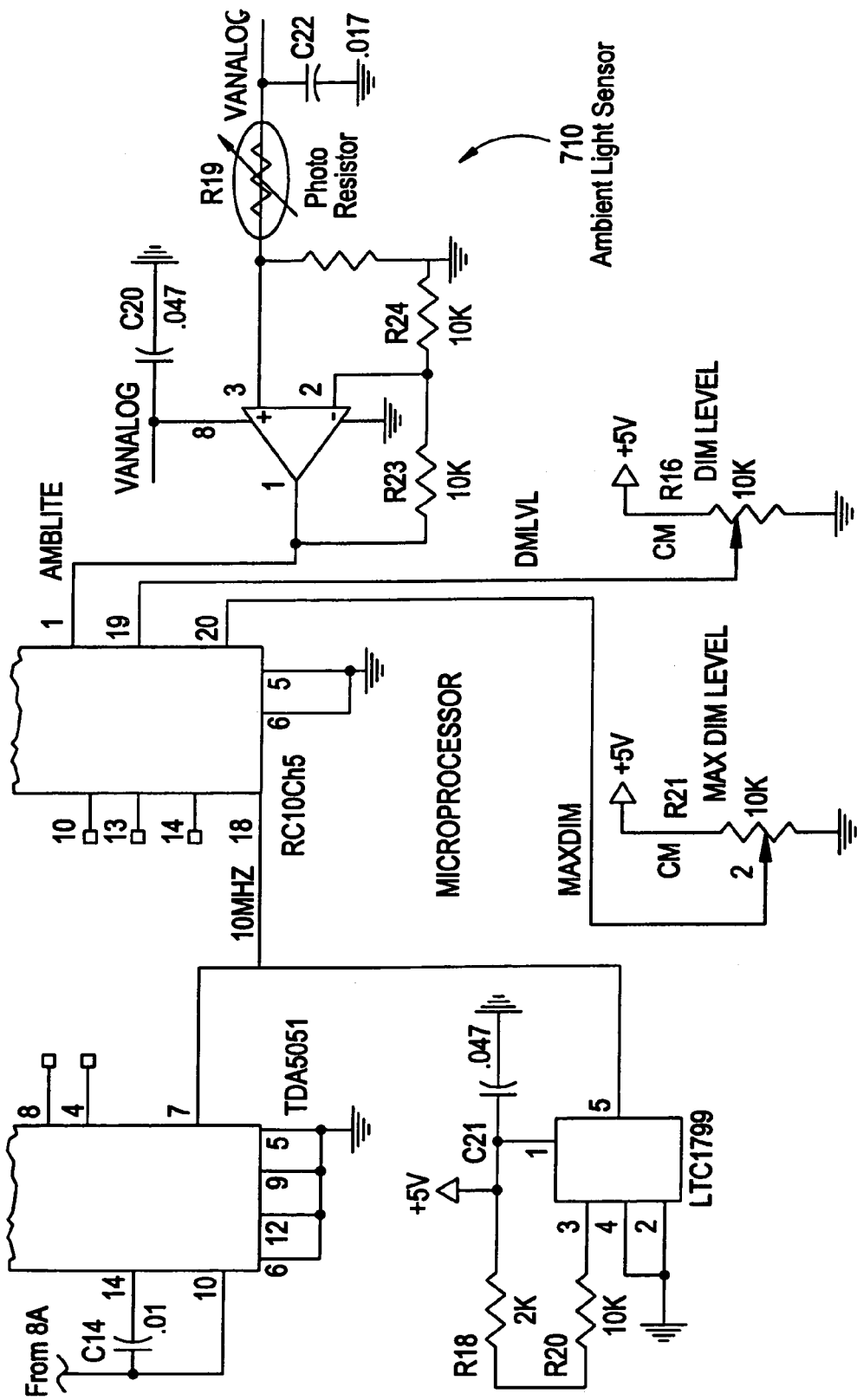

FIG. 7 shows a block diagram of an energy savings device UCD-2 according to a second embodiment, and FIG. 8 shows a schematic circuit diagram of the energy savings device UCD-2 according to the second embodiment. The energy savings device UCD-2 according to the second embodiment provides all of the functions of the first embodiment, along with extra functions. The UCD-2 includes an occupancy sensor, an ambient light sensor, and an AC line modem for remote communications to a central energy management system, for example. The UCD-2 provides a more robust energy savings function than the UCD according to the first embodiment.

As shown in FIG. 7, an ambient light sensor unit 710 of the second embodiment provides the capability to adjust the dimming level for constant level illumination during day/night ambient illumination variances. Referring also to FIG. 8, the ambient light sensor unit 710 includes a photo-resistor R19 with amplifier 720, which provides a stable indication of the total ambient illumination via a signal AMBLITE provided to port 1 of the microprocessor U2. The microprocessor U2 adjusts the dimming level to maintain this total ambient illumination level. For example, during a cloudy day, if the clouds break during the afternoon and thus the light through windows of an office increases, this results in an increase in the illumination level picked up by the ambient light sensor unit 710. Accordingly, the microprocessor U2 will adjust the load current waveform to provide a slightly dimmer signal than what was previously provided (during the cloudy period), so as to maintain a stable ambient illumination for the office.

Referring to FIG. 7, the occupancy sensor unit 730 of the second embodiment provides the capability to sense movement within an illumination area. The occupancy sensor unit 730 is configured to provide a signal indicative of no movement to the microprocessor U2 if no movement is sensed after an extended interval of time (e.g., 15 minutes or more). Upon receipt of the "no movement" signal from the occupancy sensor unit 730, the microprocessor U2 turns the light fixture off, in order to save energy. Similarly, illumination to a preset level is restored if movement occurs, such as when a person walks into a room. Referring to FIG. 8, the occupancy sensor unit 730 according to a preferred implementation includes a passive infrared sensor 750 with a multifaceted (Fresnel) lens 740 in front of a pyroelectric transducer. For example, a Murata IRA-E710ST0 may be utilized as the motion detector for the occupancy sensor unit 730. The lens 740 focuses infrared energy from a multitude of narrow, discrete beams or cones. As a warm body moves across the field of view of the detector, the transducer output has peaks and valleys which are amplified, thereby providing an indication that movement is occurring. This results in a signal MOTDET that is indicative of movement being provided to the microprocessor U2.

Referring to FIG. 7, the AC line modem 760 of the second embodiment enables bi-directional communications with an energy management unit, such as with a centralized energy management system (EMS). In one implementation shown in FIG. 8, the AC line modem is implemented as a line modem TDA5051 component. The EMS has the capability to remotely control some or all dimming functions and modes including turn off illumination (via signal PWRDWN provided to microprocessor U2), set dimming level, and verify occupancy sensor status (possible burglar alarm function). The EMS is preferably a standard personal computer with external AC line modem connected to a serial port. Software running under an operating system, such as the Windows™ operating system, maintains the status of all units within a local area. The AC line modem 760 functions by modulating a 200 KHz signal onto the AC power line via a filter network 770 that includes an inductor L1 and a capacitor C4 (see FIG. 8), in one possible implementation of the second embodiment. The EMS can communicate with a wide area of dimming units that are on a common AC line step down transformer, for example. Each dimming unit carries a unique address to facilitate a multi-drop communications network via the power lines.

In a third embodiment, unlike the "loaded" second embodiment, only the, ambient light sensor unit of the second embodiment is provided along with the features of the first embodiment.

In a fourth embodiment, only the occupancy sensor unit of the second embodiment is provided along with the features of the first embodiment.

In a fifth embodiment, only the AC line modem of the second embodiment is provided along with the features of the first embodiment. In another possible implementation, both the occupancy sensor unit and the AC line modem (but not the ambient light sensor) of the second embodiment are utilized along with the features of the first embodiment. In yet another possible implementation, both the AC line modem and the ambient light sensor (but not the occupancy sensor unit) are utilized along with the features of the first embodiment. In still yet another possible implementation, both the occupancy sensor unit and the ambient light sensor (but not the AC line modem) are utilized along with the features of the first embodiment.

A sixth embodiment of the invention includes all of the features described above with respect to the second embodiment, as well as a remote control function. The remote control function allows a user to set a light level by a remote control unit, without having to go to a switch box on a wall. By pointing the remote control unit in a direction of the switch box, and by enabling a button on the remote control unit, a signal is picked up by an element (e.g., infrared sensor, IR sensor) on the switch box, similar to a television remote control unit, whereby a room light level is either increased or decreased depending on the user's selection on the remote control unit. The remote control function can also be used with any of the other embodiments described above.

Figure 9A:
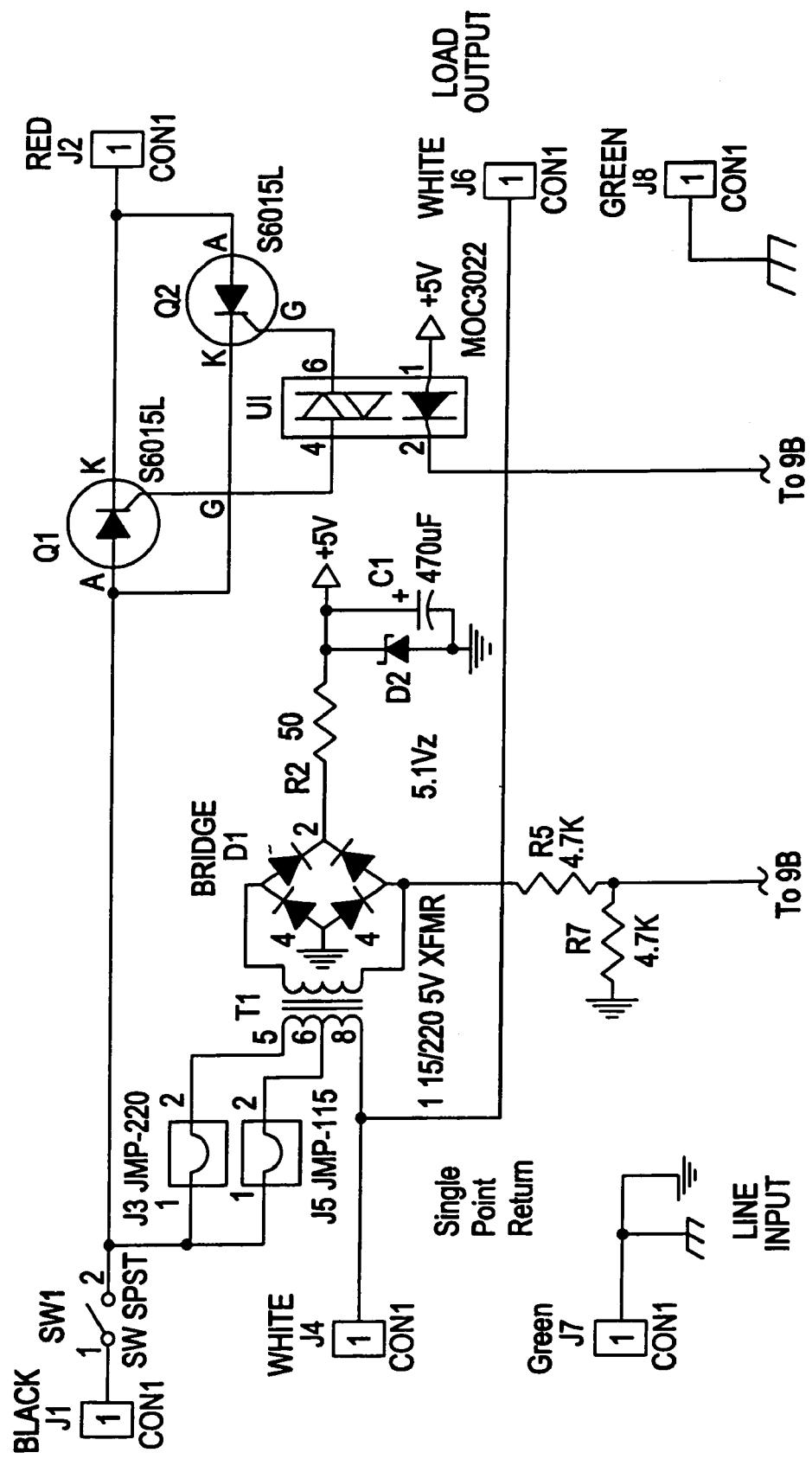
FIG. 9 is a schematic circuit diagram of a master unit according to a seventh embodiment of the invention.
Figure 9B:
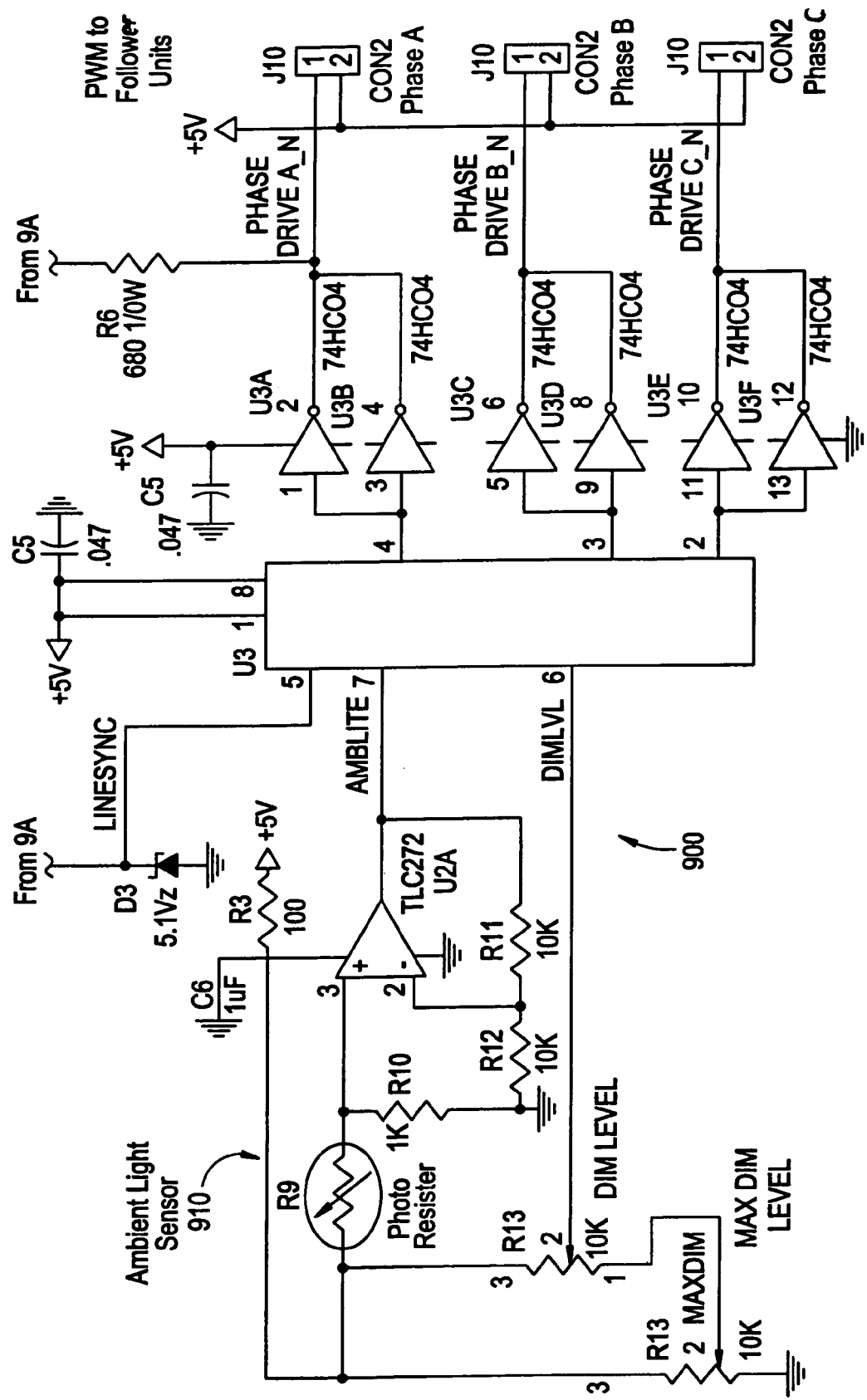
Figure 10:
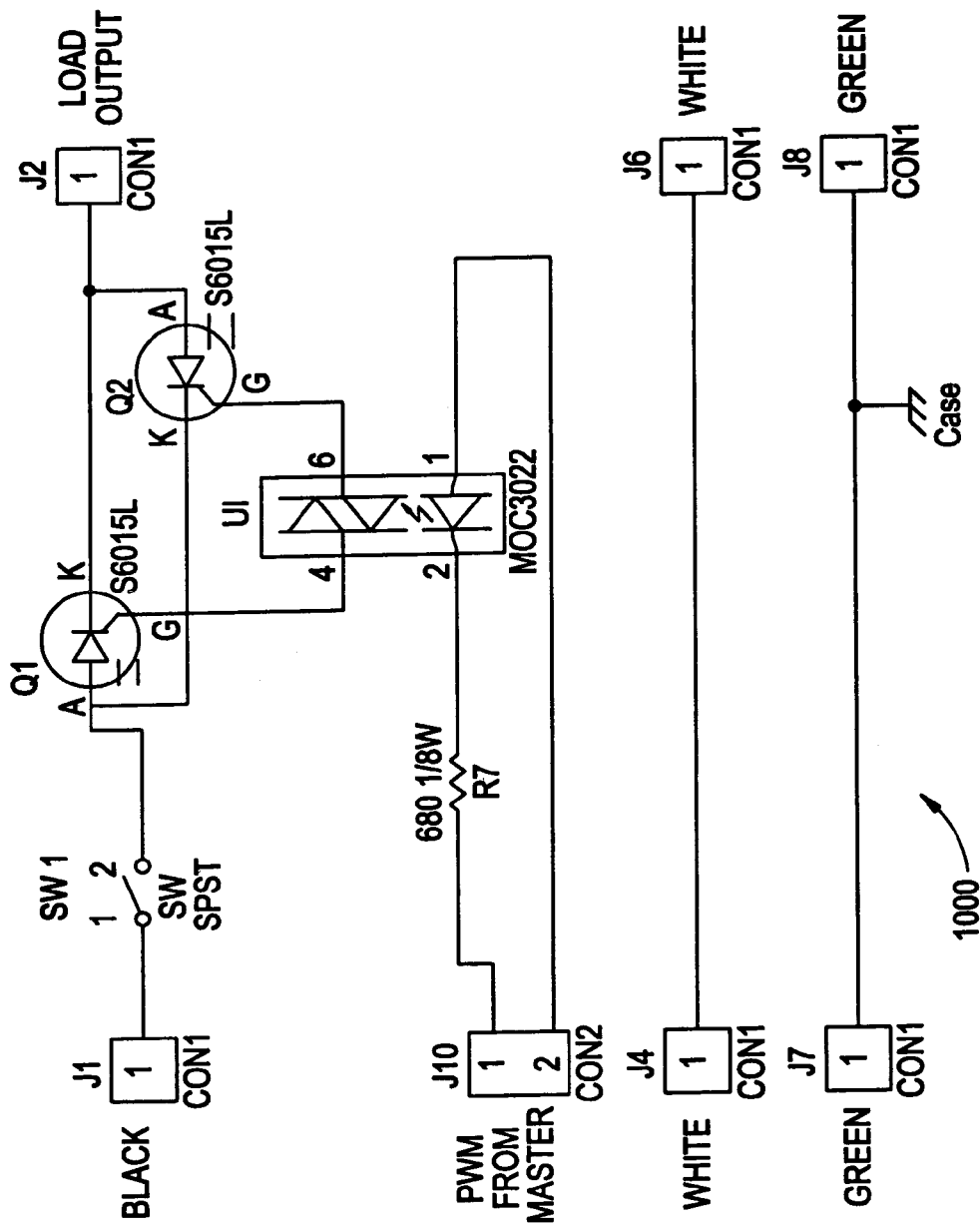
FIG. 10 is a schematic circuit diagram of a follower unit according to the seventh embodiment of the invention.

A seventh embodiment of the invention is described herein with respect to FIGS. 9 and 10. The seventh embodiment is directed to a master/follower control system, whereby a master unit controls one or more reactive loads, and whereby at least one follower unit coupled to the master unit responds exactly the same as the master unit to control loads coupled to each follower unit. The master/follower control system according to the seventh embodiment provides for modular flexibility for different sizes of facilities. FIG. 9 shows a schematic circuit diagram of a master unit 900. FIG. 10 shows a schematic circuit diagram of a follower unit 1000 that is controlled by the master unit 900 of FIG. 9.

The seventh embodiment includes a conduction angle phase switching circuit connected in parallel with a reactive load, an AC power source for switching power across the load, and a line switching circuit for enabling the application of AC power to the load through the phase switching circuit.

In the seventh embodiment, an ambient light sensor 910 is provided for generating a light control signal indicative of the amount of ambient light present in a particular location. Coupled to the light sensing circuit is a phase angle conduction control circuit, which generates and applies to a control terminal of the phase switching circuit a phase control signal to control the phase angle conduction time of the phase switching circuit, based on the amount of ambient light measured by the light sensing circuit, in order to maintain a substantially constant lighting level. In FIG. 9, the microprocessor U3 functions as the phase angle conduction control circuit.

Integrated with the phase angle conduction control circuit is an RC filter circuit which gradually increases the phase angle conduction time switching circuit from zero, or from a predetermined minimum value, to a steady state phase angle conduction time based on the ambient light conditions sensed by the light sensing circuit, after power enabling by the line switching circuit.

Referring to FIG. 9, the master unit includes a line switch SW1 connected in series with an AC power source between a hot (black) and a neutral (white) power line. Connected in series between the hot and neutral power lines is a reactive load (e.g., fluorescent lamp), and a phase angle control switching device that includes SCRs Q1 and Q2 and an opto-isolated triac U1 for driving the SCRs (see discussion with respect to the first embodiment).

Also shown in FIG. 9 is the microprocessor U3, which receives a line sync signal from a bridge circuit D1 that is coupled to the hot and neutral lines. Based on the line sync signal, and based on the setting of the potentiometer and switch SW1, the microprocessor U3 provides control signals to the opto-isolated triac U1, as well as to follower units coupled to the master unit via pulse width modulated (PWM) signaling.

FIG. 10 shows the elements of a follower unit 1000, which receives the PWM control signals from the master unit, and which controls one or more loads connected to the follower unit based on on/off switching of its active element (SCRs Q1, Q2, and opto-isolated triac U1) via those control signals.

An eighth embodiment of the invention will now be described in detail, with reference to FIGS. 11–15. The eighth embodiment is directed to a different configuration of the universal control device (UCD) described with respect to other embodiments discussed previously, and whereby the UCD according to the eighth embodiment provides for accurate dimming of Compact Fluorescent Lamps (CFLs) as well as for other types of light fixtures. While the other-described embodiments are capable of dimming CFLs as well as other types of fluorescent fixtures and incandescent fixtures, the UCD according to the eighth embodiment performs this dimming (at least with respect to CFLs) in a more stable and effective manner.

The functions, capabilities, and optional auxiliary hardware defined and mentioned with respect to the other-described embodiments of the UCD apply equally as well to the eighth embodiment. Although the UCD according to the eighth embodiment makes use of the Safety Ground for synchronization purposes only, the UCD can still be considered a "2-Wire" dimmer, in that it can be installed into any standard wall outlet without benefit of the Neutral wire.

The UCD according to the eighth embodiment allows more stable and deeper dimming of all types of loads including Magnetic Ballast Fluorescent fixtures, Electronic Ballast Fluorescent fixtures, Compact Fluorescent Lamps, halogen, as well as all types of incandescent lamps, or a motor for a fan or other device. Depending on the application, it may be the case that fluorescent tube life might be reduced somewhat, although there is no concrete evidence of this being the case. Specifically, the UCD according to the eighth embodiment implements a more robust line synchronization circuit, a higher performance processor, and a simpler but more stable dimming algorithm, as compared to the previously-described embodiments of the UCD.

Additionally, software has been written by the inventors for the processor utilized in the UCD according to the eighth embodiment in the standard "C" language. The following paragraphs will describe in detail the differences, advantages, and performance enhancements that are realized by the UCD according to the eighth embodiment.

CFLs can be dimmed by phase control methods, but success depends on several factors which influence the design of the UCD dimmer. Specifically, the inventors of this application have realized that both voltage synchronization and precise phase timing are important to a stable, flicker free output. Undimmed CFL lamps draw all their current for the entire AC half cycle during the peaks of the AC voltage waveform. This is because they implement a bridge rectifier input charging a capacitor filter to realize DC power, as seen by the bridge rectifier 1310 and the capacitor 1320 in FIG. 13. The capacitor 1320 charges only when the AC input is of higher voltage than the capacitor 1320. This occurs only near the peak extremes of the AC input voltage. For CFLs, the period of this current flow is approximately 0.5 mS, and varies with the CFL design itself. Because of this, there is zero dimming of a CFL if the switch element is triggered ON during the first 90° of the AC waveform. In the UCD 1200 according to a preferred implementation of the eighth embodiment, CFL dimming occurs during the 90° to 180° period for the first half of the AC Cycle, and similarly during the 270° to 360° period for the second half of the AC Cycle. Other periods of dimming may be envisioned by one skilled in the art, while remaining within the scope of the invention.

Figure 15:
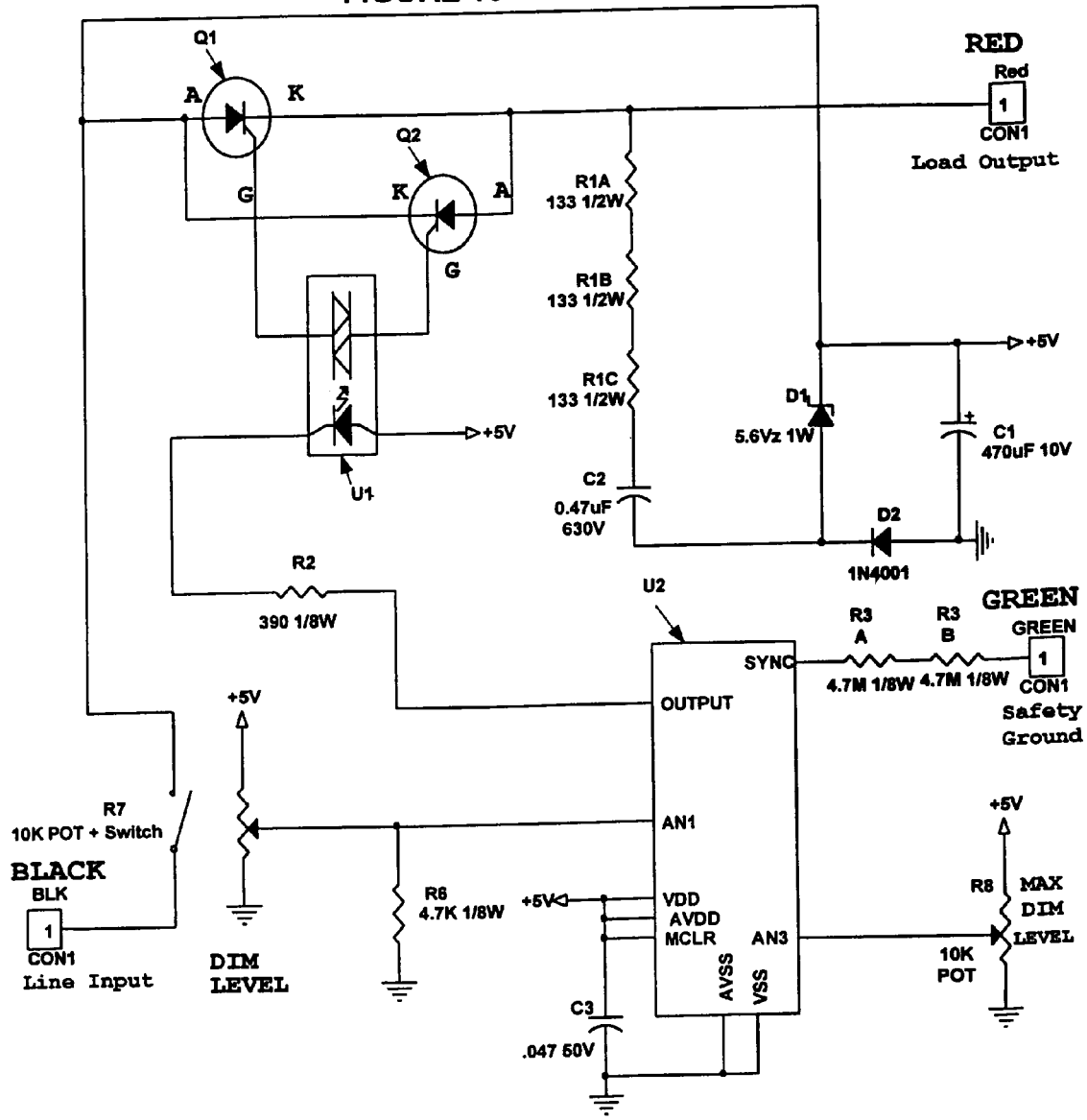
FIG. 15 shows a detailed schematic circuit diagram of the components making up the universal control device according to a preferred implementation of the eighth embodiment of the invention.

Realistically, a typical CFL lamp will extinguish with a phase delay approaching 160° and 340°. To achieve this degree of phase delay requires an accurate synchronization signal derived from the Line voltage waveform. The previously-described. UCD embodiments rely on a noisy and relatively unstable current zero crossing for synchronization. This noisy and relatively unstable sync signal may result at times in some amount of undesirable lamp intensity flickering. The UCD 1200 according to the eighth embodiment facilitates accurate synchronization, and increased phase delay timing that is compatible with flicker free dimming of CFL lamps and other types of fluorescent and incandescent lamps. Referring to FIG. 15, the UCD 1200 according to the eighth embodiment utilizes SCRs Q1, Q2, and Opto-Triac U1, for the solid-state switch unit of the UCD 1200, similar to the other-described embodiments (e.g., see FIG. 4). Alternatively, MOSFETs may be utilized for one or more components of the solid-state switch unit.

A processor U2 is connected to the Opt-Triac U1 via the OUTPUT line of the processor U2, with a resistor R2 provided therebetween. Similar to the other-described embodiments of the UCD, a potentiometer and switch unit R7 is utilized to set the dimming amount. A potentiometer R8 is also connected to the processor U2, and is used to set the maximum dim level. The potentiometer R8 is a 10K potentiometer and the potentiometer and switch unit R7 also has a resistance of 10K in the preferred implementation of the UCD 1200 according to the eighth embodiment.

Also shown in FIG. 15 are resistors R1A, R1B, R1C, capacitors C1, C2, and diodes D1, D2, which are coupled to the RED line (Load Output). In FIG. 15, the resistors R3A, R3B together serve the same function as the resistor R1 shown in FIG. 11, and are connected in series to the GREEN safety ground line.

One problem with the "current zero crossing" synchronization circuits of the previously-described embodiments of the UCD is that the synchronization circuit implementation is not exceedingly stable with different loads, whereby the synchronization could drift as the load is dimmed. The effect of this can be some slight flickering with certain types of loads, as well as relatively non-linear dimming as the potentiometer is rotated. Also, a load such as a CFL and most electronic ballast devices cannot be adequately synchronized using this type of circuit. As a result, software is utilized for the processor U2 in these earlier-described UCD embodiments in order to maintain a desired level of line synchronization for these current zero-crossing synchronization circuits. Whenever line synchronization is lost, flickering, flashing, or similar unstable load behavior results.

Figure 11:
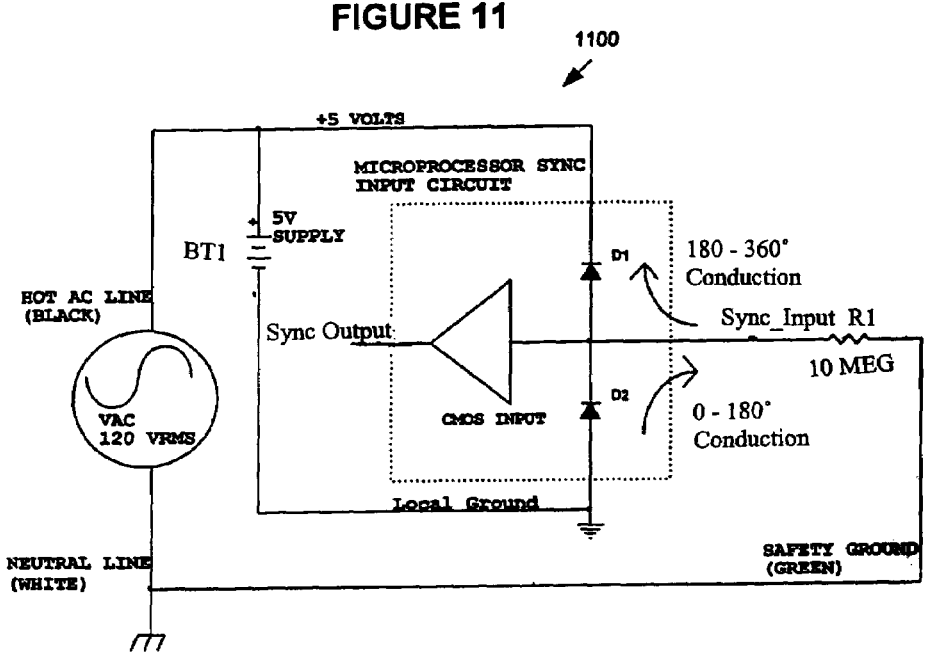
FIG. 11 shows a synchronization circuit utilized in the universal control device according to an eighth embodiment of the invention.

Referring now to FIG. 11, the UCD 1200 according to the eighth embodiment utilizes a different type of synchronization circuit 1100 that makes use of the Green Safety ground to provide the microprocessor with a very stable load-independent synchronization signal. This effectively provides a stable Voltage Waveform synchronization without violating the concept of a 2-Wire dimming device (the previously-described embodiments utilized current waveform synchronization that synchronize on the zero crossings).

One well known specification (Underwriter's Laboratory) sets forth a maximum safety ground current of 500 uA (Micro Amperes) for a wall switch, which may be sourced or sunk by the Green Safety ground. This Green Safety ground is present in every wall switch box. By using a series resistor R1, such as a 10 megaohm resistor, between the synchronization pin SYNC_INPUT of the microprocessor and the Safety ground, an RMS safety ground current of less than a predetermined amount (e.g., less than 12 uA RMS) is achieved.

An important concept in understanding how this works is realizing that the +5V supply BT1 is actually the same as the "Hot" power input (Black Wire). The +5V power supply BT1 actually pulls down the ground through resistor R1, diode D1 and diode D2 through the load when it is OFF. Battery BT1 with its positive terminal tied to the hot side of the AC line represents the UCD circuit power supply for the UCD 1200 according to the eighth embodiment.

In a preferred implementation, the microprocessor synchronization pin SYNC_INPUT (which is initialized as an edge triggered interrupt input) has internal protection diodes D1, D2, which clamp the Sync Input signal to always be between VDD (e.g., +5V) and local ground (LOCAL RETURN). As the Black source wire rises above the Safety ground potential during 0 to 180 degrees, current flows up through protection diode D2, then through resistor R1, thereby keeping the sync input at local ground potential. Alternatively, as the Black source wire drops below the Safety ground potential during 180 to 360 degrees, current flows down through the Safety ground, through resistor R1 then up through protection diode D1, keeping the Sync Input at VDD potential. The result is a very clean square wave with very little noise, practically zero phase delay, and nearly totally independent of load type or dimming level.

The synchronization circuit 1100 utilized in the UCD 1200 according to the eighth embodiment provides a stable synchronization without benefit of the neutral wire. One small side effect as compared to the previously-described embodiments of the UCD is that no longer are the two dimmer wires interchangeable, since the +5V circuit is tied to the AC Hot Black wire. This is of no major consequence, since the UCD 1200 according to the eighth embodiment still installs in series with the load (see FIG. 13, for example), just that the proper polarity of the UCD dimmer needs to be observed for proper operation of the UCD 1200 according to the eighth embodiment.

Figure 12:
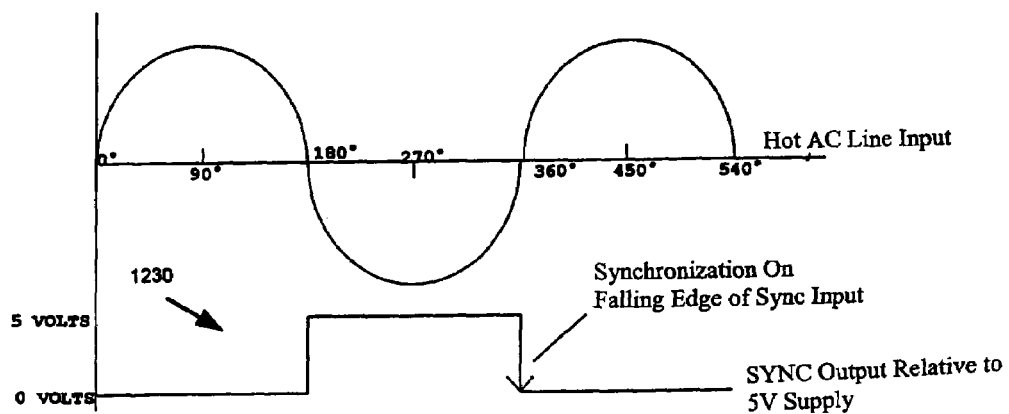
FIG. 12 shows a synchronization waveform as compared to the Hot AC line input voltage, according to the eighth embodiment of the invention.

FIG. 12 shows a waveform obtained by the synchronization circuit 1100, whereby a synchronization signal 1230 that is synched relative to the +5V power supply is obtained, and whereby the synchronization signal 1230 is high (e.g., logic "1" state, or +5 volts) when the Hot AC Line Input is between 180 and 360 degrees. Synchronization is performed on the falling edge of the synchronization signal in the preferred implementation of the eighth embodiment.

The previously-described embodiments of the UCD utilize an 8 pin PIC12C672 microprocessor device in the preferred implementation of those embodiments. In the preferred implementation of the UCD 1200 according to the eighth embodiment, a higher performance PIC 16C771 microprocessor device is used, as shown by element U2 in FIG. 15. One problem with the PIC12C672 is it only had an 8-bit timer, and requires software to sample the timer to initiate switching events. Although this works fairly well in practice, very tight and efficient assembly language software timing is important for stable load control. Also, an 8-bit timer provides only limited dimming resolution (approximately 32 microsecond resolution), whereby discrete dimming steps could be seen by the human eye as the load is dimmed for the previously-described embodiments of the UCD, which is undesirable.

Utilization of a higher-performance microprocessor that implements a more robust (e.g., a 16-bit) timer with a compare interrupt (CCP) function, as in the UCD 1200 according to the preferred implementation of the eighth embodiment, relieves the processor of any critical software execution timing. This hardware interrupt function allows compiled "C" language to be used, thereby greatly simplifying integration and test of the UCD 1200. Additionally, timing resolution is around 2 microseconds for the UCD 1200 according to the eighth embodiment, which provides visually imperceptible dimming steps. Also, the PIC16C771 microprocessor has an internal 12 Bit Analog to Digital converter for increased resolution when reading the Dim and Maximum Dim potentiometers. The result of the use of this stronger processor is a more accurate and stable dimming with less flickering.

The UCD 1200 according to the eighth embodiment also utilizes a simpler, more stable dimming algorithm as compared to the previously-described embodiments of the UCD. In the earlier-described embodiments, the synchronization signal is triggered when the series switch element (Triac or Back to Back SCRs) turns OFF. The switch turns OFF when the current through the device reaches Zero. This signal is noisy when controlling inductive loads, requiring the addition of an RC filter network to remove that noise. Depending on the reactive characteristics of the load, and the commanded dim level, this sync signal moves several milliseconds relative to the Voltage zero crossing. Accurate control of the Load is somewhat difficult, requiring complex software to reject spurious noise which occasionally gets through the filter, as well as limiting the amount of dimming possible so that all types of loads could be controlled to some degree without miss-triggering of the switch element. Any miss-trigger or shift in the trigger timing causes the sync signal to temporarily move, resulting in unacceptable flickering.

In conjunction with the synchronization circuit 1100 described earlier and shown in FIG. 11, the synchronization algorithm as utilized in the UCD 1200 according to the eighth embodiment becomes simpler, and as a byproduct, more stable. Additionally, switch element triggering can be accurately delayed much longer into the AC waveform providing additional dimming to those devices that can make use of it (e.g., CFLs and Incandescent Lamps) without sync movement, or flickering issues. The synchronization algorithm utilized in the UCD 1200 according to the eighth embodiment is relatively simple in that it simply uses the processor 16-bit Timer to initiate events during the AC cycle. This Timer is effectively synchronized at each rising zero crossing of the AC Voltage waveform by the synchronization circuit 1100 explained earlier. During testing, it was also found that very quick changes to the commanded load dim level could cause the timer compare function (CCP1) to miss incremental interrupt events. To eliminate this problem, a slow dim function can be added, whereby phase timing is moved slowly in response to any speed DimLevel potentiometer adjustment. Further explanation of the synchronization control software will explain this point in more detail.

Along with the upgraded processor, a "C" complier is utilized in the preferred implementation of the eighth embodiment to allow a much simpler but effective program to be written in the "C" computer language.

Figure 13:
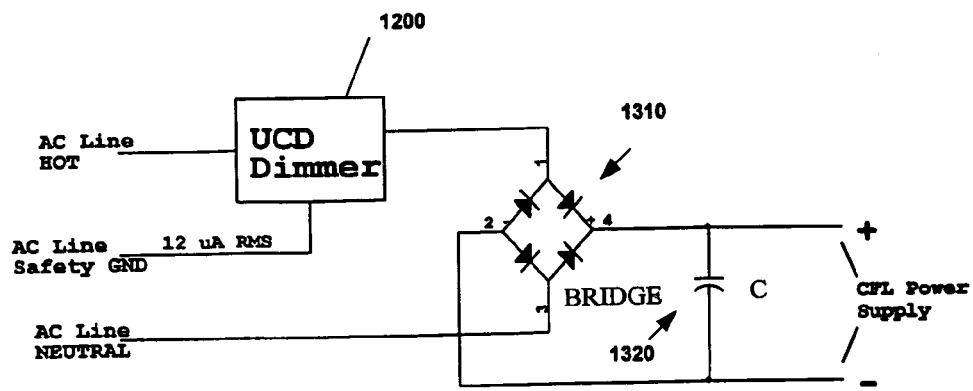
FIG. 13 shows a circuit diagram of a universal control device according to the eighth embodiment of the invention being used to control a compact fluorescent lamp.

FIG. 13 shows the connection of the UCD 1200 according to the eighth embodiment, from the AC line through the input circuit of the CFL (not shown), whereby the input circuit of the CFL includes a bridge rectifier 1310 and a capacitor 1320, which are connected to a CFL power supply. Higher voltages at the CFL power supply location provide higher lamp intensities, while lower voltages result in lower lamp intensities.

Figure 14:
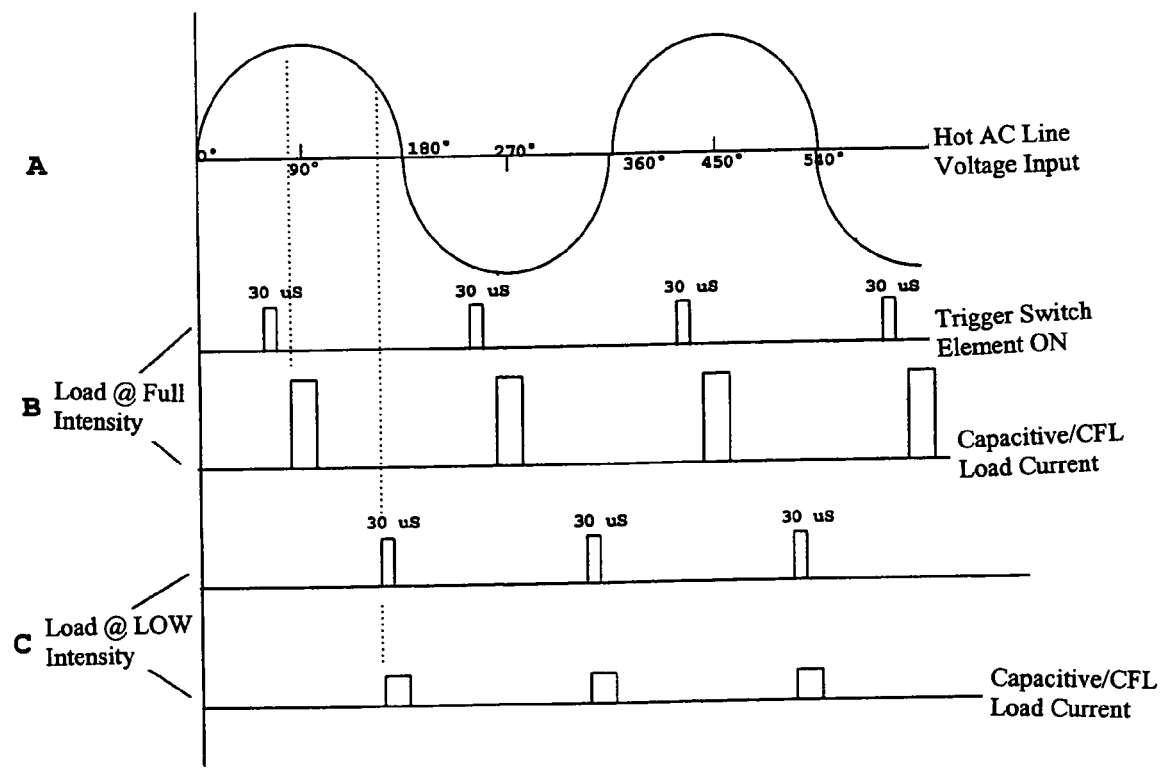
FIG. 14 shows switching element trigger timings for the universal control device according to the eighth embodiment of the invention.

FIG. 14 illustrates switching element trigger timing and subsequent CFL current at both high (waveforms designated by "B") and low lamp intensities (waveforms designated by "C"). As is shown in the second and third waveforms in FIG. 14, triggering that occurs just prior to the peak (90) of the AC line voltage (waveform designed by "A") results in both higher level current spikes being transferred to the CFL with a higher applied voltage. This timing results in the highest applied power and resulting lamp intensity. If the switching element trigger is delayed further relative to the applied AC voltage waveform as shown in the fourth and fifth waveforms in FIG. 14, the applied voltage is much lower, which results in lower level current spikes, lower applied power, and lower resulting lamp intensity.

The code utilized for the synchronization algorithm according to the preferred implementation of the UCD 1200 according to the eighth embodiment is described below in detail.

Declarations:

The processor specific header file (16C771.H) is included. Specific register addresses, Bit definitions etc. are found in this file. Then the processor is declared having a 12 bit Analog to digital converter. The Fuses line, declares that the internal 4 MHz clock will be used (INTRC), the internal watchdog timer will not be used (NOWDT), that the security bit protecting against readout of the internally stored code is enabled (PROTECT), that the low voltage brown out detect circuit is enabled (BROWNOUT), the 200 mS power up timer is enabled (PUT), and that the brown out reset voltage is set to 2.7 Volts (BORV27).

Parameter Definitions:

Intwindow: This parameter defines a sync window either side of the synchronization falling edge to be 110 two uS counts (total of 220 uS). This means that the sync interrupt is reset then enabled 220 uS before the expected edge, and if the sync does not occur with 220 uS after the edge, it will freewheel using the calculated sync timing.

TriaconTime: This is the period of time (30 uS) which the OptoTriac device is triggered on. The OptoTriac will trigger/latch itself as well as the Switch Element ON if a load current of greater than 100 uA flows within this period of time.

Warmtime: This is the number of line syncs that the load will be held to full intensity. For this application 1800 line syncs (16.667 mS each) results in a load warmup time of 30 seconds.

Phaseadv: This parameter is used to advance phase timing to achieve additional load/lamp intensity. This value is determined empirically through test.

Define ON/OFF: Defines the State of the output port to turn ON/OFF the Opto-Triac.

Prototypes:

Just a list of functions that occur in the program. Functions must be declared before they appear in the code.

RAM Definitions:

Note that Integers define an 8 bit value, and Long defines a 16 bit value.

Phaseswitch: A counter which switches based on which Compare Interrupt (CCP1) occurred.

Status: Four Bits are used, and defined in Bit Definitions

Temp: Short Term 16 bit temporary register

Temp1: Short Term 16-bit temporary-register

Phasecntr: This counter counts full AC cycles, and is used to determine AC waveform timing, as well as the warmup period.

Cyclecntr: This is a value representing the number of 2 uSec counts in one AC Cycle. For a 60 Hz system, the resulting value of this counter is nominally 0×208D.

Quartcntr: A value representing 90° of the AC Cycle. Nominally: 0×1869

Halfcntr: A value representing 180° of the AC Cycle. Nominally: 0×1046

Thrqrtcntr: A value representing 270° of the AC Cycle. Nominally: 0×823

Zerocntr: At each Sync edge interrupt the current 16 bit Timer 1 count is stored here And used to offset all phase timing for the current AC Cycle.

Dimcnt: This is where the calculated phase delay is Stored. Dimcnt is in 2 uSec units.

Maxdim: This is where the calculated phase delay (from reading the MaxDimPot analog value) is stored. MaxDim is in 2 uSec units.

Targetdim: To implement slow changes to the phase delay, the DimLvl pot analog is used as the basis of this targetdim value. The actual dimcnt value is incrementally adjusted to match this Targetdim value. In this fashion the slow dim function is implemented.

Bit Definitions:

Syncdun: Flag which indicates that the Line Frequency timing calcs are completed Warmdun: Flag indicating that the Warmup time has passed.

Domaxdim: Flag set in the CCP1 interrupt to kick off the Maxdim A/D conversion

Dodimlyl: Flag set in the CCP1 interrupt to kick off the Dimlyl A/D conversion

Intinput: Defines that Register6, Bit 0 is the Edge Triggered Sync Input Address Phase_on: Defines that Register6, Bit 1 controls the OptoTriac LED Phase_tri: Defines that Register 86, Bit 1, controls the Tri-State function of the Phase_on output pin.

INT_CCP1: Compare Interrupt

This interrupt service routine provides the timer 1 based control of the Switch element. The value of phaseswitch is used to determine which event will be serviced during this interrupt. For each AC cycle, there will be four CCP1 compare interrupts. Phaseswitch cycles from 1 through 4 for each AC cycle. During each event, the calculated time of the next event is loaded into the CCP_1 register. When the just loaded CCP_1 value is equal to the free running Timer 1 value, the next CCP_1 interrupt is generated. In the manner, very accurate phase timing can be implemented with minimal regard to processor execution speed. The zerocntr value is loaded at each sync interrupt and used to offset the loaded timer1 count during the CCP_1 interrupt. Timer1 is allowed to free run, thereby eliminating any latency issues associated with resetting or reloading Timer1 with specific values.

Phaseswitch=1: This CCP_1 interrupt occurs at the sync interrupt plus the intwindow value.

Nominally this will be at 220 uS after the sync zero crossing. This signals the end of the synchronization window. If the sync interrupt had occurred, zerocnt would have been adjusted in the sync interrupt routine. If it didn't, then we're free wheeling from the last zerocntr+cyclecntr values. At this time, the sync interrupt is disabled. Additionally, the domaxdim flag is set, whereby the maxdim analog conversion will be updated during processor idle time. The next CCP_1 compare value is loaded. Note that the zerocntr value increments nominally by on cyclecntr value each AC cycle, the quartcntr value is static, and the dimcnt value represents the calculated phase delay which corresponds to the commanded load dim level.

Phaseswitch=2: This CCP_1 interrupt occurs at zerocntr+quartcntr+dimcnt. This is time that the Switch element is triggered ON for a period of triacontime in uSec. The Switch element remains latched ON until the current through it drops to zero. This will occur sometime after the next AC voltage waveform zero crossing, depending on the reactive characteristics of the load. The next CCP_1 compare value is loaded.

Phaseswitch=3: This CCP_1 interrupt occurs at zerocntr+ thrqrtcntr+dimcnt.

Functionally this event is identical to Phaseswitch=2, except it occurs exactly one half cycle later. Additionally, the dodimlyl flag is set, whereby the dimlyl analog conversion will be updated during processor idle time.

Phaseswitch=4: This CCP_1 interrupt occurs at zerocntr+ cyclecntr−intwindow.

Effectively, this is the next sync interrupt—intwindow, or nominally at 16.667 mS—220 uSec from the last sync interrupt. This is the start of the interrupt window. During this event, any sync interrupt flags are cleared, and the sync interrupt is enabled. Also the value of phaseswitch is cleared.

Upon Exit, the value of phase switch is incremented. In addition to during the Phaseswitch=4 event, the value of phaseswitch is also cleared during each sync interrupt. In this manner, if a sync interrupt is missed, the value of phaseswitch will be maintained while syncs are free wheeling.

INT_EXT: Line Synchronization External Interrupt

This interrupt service routine calculates line frequency parameters, as well as updates the zerocntr, phasecntr, and phaseswitch values. This interrupt is initialized to occur at each falling edge of the sync input pin. During initialization, 20 sync interrupts are allowed to pass while things stabilize. At the 20$^{th}$ sync, Timer1 is set to zero. When the 26$^{th}$ sync occurs, Timer1 has free run from a count of zero for 6 full AC cycles. Timer 1 is incremented at a 500 Khz rate. The cyclecntr, halfcntr, quartcntr, and thrqrtcntr timer values are calculated from the time it took for 6 complete AC cycles to occur. Measuring/calculating timing in this fashion reduces the need for an accurate microprocessor oscillator, plus provides compatibility with both 50 and 60 Hz line frequencies. After these line timing parameters are calculated, the Timer1 compare interrupt (CCP_1) is enabled to occur at the current time plus 30 counts. Finally, the syncdun flag is set indicating that the sync timing calculations have been completed.

Main( ), Reset( ): Main and Reset Functions

Since this program is entirely interrupt driven, the Main ( ) function is quite simple. Additionally, if additional functions need to be added, there is ample processor time available between interrupts.

Reset( ): First the Reset function is called, whereby the internal microprocessor peripherals are initialized, memory variables are initialized, and the external sync interrupt is enabled. Then the program waits for completion of the sync timing calculations. When this is complete, an adjustment of—phaseadv counts (Nominally 200) is made to the quartcntr and thrqrtcntr values. These two values are only used to trigger the Switch element ON. This was an easy way to increase the effective phase timing available (increased load/lamp intensity) while maintaining line frequency independence, and preserving the circuit power supply.

After returning from Reset, Main compares the value of phasecntr to see if it's reached the warmtime count. If so it sets the warmdun flag, allowing normal load dimming to occur. Next a very simple Flag based task switcher calls the rdmaxdim( ), and rddimlvl( ) functions.

Rddimlvl( ): Read the DimLvl potentiometer, Slow Dim Implementation

Although A/D conversions are 12 bit values, only the most significant 10 bits are used. The PIC16C771 stores these 12 bit conversions left justified in a 16 bit variable to maintain code compatibility with microprocessors with 8 bit A/D converters. To fix this, the stored 16 bit value must be right shifted by 6, then ANDed with 0x3FF to result in a 10 bit result. A 10 bit result has a range of 0 to 1024 decimal. Because perceived dimming is not linear with phase shift, a simple one point correction is implemented. If the 10 bit dimlyl is less than 300, then it is multiplied by two. This will span a count range of zero to 1198 counts, while giving a slope of two. If it is greater or equal to 600, 600 is Added to it. This will extend the range from 1200 to 1624 with a slope of One. The total extent of the calculated value is 0 to 1198 with a slope of Two, and 1200 to 1624 with a slope of One. When used to control the Timer1 Compare interrupt which has a resolution of 2 uSec, the total timing range is 0 to 3.248 mSec. Targetdim is loaded with this calculated value each AC cycle.

Slowdimming: Each AC cycle, the variable dimcnt is incremented or decremented until it matches the targetdim value. In this manner dimcnt always chases the value of targetdim. To allow dimcnt to always catch targetdim in a reasonable period of time, a two speed step is implemented. The code provides a step of either 1 or 4 each AC cycle, depending on how far away dimcnt is from targetdim. In the event of a full range step, dimcnt will catch target dim in 1624 counts/4 counts per step*16.667 mSec per step or 6.8 Seconds. This would be the absolute worst case time.

Rdmaxdim( ): Limit the maximum dim level

Because each load behaves differently when dimmed, a Maxdim potentiometer is provided which limits the total phase delay that dimcnt can achieve. Similar to when reading the dimlyl potentiometer, a 10 bit conversion is calculated. In this case, an offset of 500 counts is added to it. This corrected maxdim value is used in rddimlvl( ) to clamp dimcnt.

The C-language software utilized by the processor U2 in the UCD 1200 according to a preferred implementation of the eighth embodiment, is provided below for sake of completeness.

---

SOFTWARE IN "C":

---

```
// Initial Code Date: 8/14/04//For PIC16C771 Chip Sept 12,2004
// UCD_CFL This code uses the UCD hardware and the 16C771 Microprocessor to dim CFL Lamps
// The Safety Ground (Green Wire) is used for Line Synchronization
// UL indicates a Maximum of 500 micro amps may be dumped into the Safety Ground
// A minimum of 9.3 Megohms to the Safety Ground will Guarantee that less than
// 20 Micro Amps Peak will flow. RMS will be less than 15 Micro Amps
// Dual Slope dim level delay timing is implemented to "linearize" the Pot.
```

-continued

SOFTWARE IN "C":

```c
// A/D conversions are the Ratio of +5V supply for supply voltage rejection.
// All calculations are line frequency independant, providing compatibility to 50 or 60 Hz systems.
// Tools/Compiler Option Line:      C:\Program Files\PICC\Ccsc +FM +DS +DC
// The Program
//Declarations
#include <16c771.h>
#device PIC16C771 ADC=12        //12 Bit Conversions
#fuses INTRC,NOWDT,PROTECT,BROWNOUT,PUT,BORV27
#use delay(clock=4000000)    //4000000 4MHz Clock for Delays
//Parameter Definitions   // 2 uSec Timer Counts
#define intwindow 150       // intwindow: 50 is Boarderline: Timer count Window for Interrupt
#define triacontime 30    // triacontime: Time the Triac is Held ON in Micro Seconds
#define warmtime 1800          // warmtime: 1800 = 30 Seconds. Num Syncs to warm up Load
#define mindim 400
#define strtdim 1900
#define ON 0x00              //Turning the Load ON requires a 0 to be written to the output port.
#define OFF 0x01             //Turning the Load OFF requires a 1 to be written to the output port.
//Prototypes
void comp_int( );
void sync( );
void reset( );
void rddimlvl( );
void rdmaxdim( );
//RAM Definitions
int phaseswitch;            //Phase Switch Register
int status;                 //Status Register
long temp;       //Temp Register
long temp1;      //Temp Register
long diminc;     //Increment each loop to change dimcnt
long phasecntr;     //Counts AC cycles, Used for timing and warmup
long cyclecntr;     //Timer Counts for One full Cycle
long eightcntr;     //Timer Counts for 45 degrees
long halfcntr;      //Timer Counts for 180 degrees
long fiv8cntr;      //Timer Counts for 225 degrees
long zerocntr;      //Timer Count at Sync Interrupt: Zero Count Reference
long dimcnt;     //Calculated phase delay from dimlevel pot
long maxdim;       // maxdim: Maximum counts to delay trigger, Higher Numbers go dimmer
long targetdim;         //targetdim: Accumulator for Dim for slow dim
//Bit Definitions
#bit syncdun =status.0  //Sync Calculations Done
#bit warmdun =status.1    //30 Sec. Warm UP done
#bit domaxdim =status.2     //Set during each sync interrupt, Kicks off A/D conversions
#bit dodimlvl =status.3     //Set during each sync interrupt, Kicks off A/D conversions
#bit intinput =0x06.0 //Sync Input
#bit phase_on =0x06.1 //RB1 Load ON =0, Load OFF =1
#bit phase_tri =0x86.1 //RB1 Tristate is 0 = Output
#INT_CCP1         //Timer1 = Compare Value Interrupt
comp_int( ) {
    switch (phaseswitch){
        case 0x01: {                  // Zero Crossing +intwindow
            DISABLE_INTERRUPTS(INT_EXT);
            temp = (zerocntr +eightcntr +dimcnt); //Dimcnt is the Variable Dim Count
            CCP_1 = temp;      //CCP1: Dead1
            domaxdim =1;
            break;
        }
        case 0x02: {             //1st Half of Cycle: Time to Trigger ON Triac
            phase_on =ON;
            delay_us(triacontime); //Software Timer here, Not Critical
            phase_on =OFF;           //Triac Turns OFF when Load current is Zero
            temp = (zerocntr +fiv8cntr +dimcnt);
            CCP_1 = temp;    //Triac Latched ON, Turns OFF when Load current is Zero
            break;
        }
        case 0x03: {             //2nd Half of Cycle: Time to Trigger ON Triac
            phase_on =ON;           //Software Timer here, Not Critical
            delay_us(triacontime); //Triac Latched ON Turns OFF when Load current is Zero
            phase_on =OFF;          //Triac Turns OFF when Load current is Zero
            temp = (zerocntr +cyclecntr –intwindow);
            CCP_1 =temp;
            dodimlvl =1;
            break;
        }
        case 0x04: {           //Set Up for Next Line Sync Interrupt
            zerocntr +=cyclecntr;
            phaseswitch =0;             //Incremented to 1 before Int Exit
            CCP_1 =(zerocntr +intwindow);
```

SOFTWARE IN "C":

```
            #asm
                bcf 0x0b,1              //Clear External Interrupt Flag
            #endasm
            ENABLE_INTERRUPTS(INT_EXT);
            break;
        }
    }
    phaseswitch +=1;    //phaseswitch rolls 1 to 4
} //End comp_int( )
#INT_EXT        //External Interrupt on CPUSYNC
sync( ) {       //Falling Edge
    zerocntr =GET_TIMER1( ); //Get counter at Interrupt, Timer Resolution is 2.000 uSec
    phasecntr +=1;      //TMR1 overflows at Cycles, Stop it at 6
    phaseswitch =1;
    if (syncdun ==0) {
        if (phasecntr >= 26) {                  //First Time Through
            cyclecntr = zerocntr /6;            //Cyclecntr is 1/6th of 6 cycles or 1 Cycle
            halfcntr = zerocntr /12;            //Halfcntr is 180 degrees
            eightcntr = zerocntr /48;
            fiv8cntr = halfcntr +eightcntr;
            CCP_1 =(zerocntr +50);              //Kick first CCP Interrupt
            ENABLE_INTERRUPTS(INT_CCP1);        //CCP ints are enabled only
after sync timing is done
            syncdun =1;                         //Done with Sync Timing
        }
        if (phasecntr == 20)                    //Let a few Interrupts in B4 Clearing Counter
            SET_TIMER1(0x0000);                 //Only done at Startup, Otherwise Rolls
    }
} //End sync( )
main( ) {
    reset( );
    while (1) {             //Warm Up time, Load is ON
        if ((phasecntr >= warmtime) && (warmdun ==0)) //1800 = 30 Seconds
            warmdun =1;
        while (domaxdim ==0);                   //Wait for next sync
            rdmaxdim( );
        while (dodimlvl ==0);                   //Wait for next sync
            rddimlvl( );
    }
} //End main( )
void reset( ) {     //Reset Function Initialize RAM
    phase_on =OFF;  //Turn off Load
    phasecntr =0;
    cyclecntr =0;
    targetdim =0;
    phaseswitch =1;     //Phase Switch Register, Rolls 1 to 4, no zero
    halfcntr =0;
    syncdun =0;
    warmdun =0;
    diminc =4;      // During Startup, Dim Level Changes are Very Slow
    phase_tri =0;   //TrisB 0x86.1: 0 = Output, 1 is Input
    dimcnt =strtdim;
    maxdim =strtdim;
    targetdim = mindim;  //Count from Startdim to Min Dim during Warmup
    rdmaxdim( );
    SETUP_ADC(ADC_CLOCK_DIV_32);
    SETUP_ADC_PORTS(sAN0|sAN3);
    SETUP_TIMER_1(T1_INTERNAL|T1_DIV_BY_2); //Timer1 Fosc/4 = 250nS, Free Run
    delay_ms(400);              //Wait Additional 400 mS for Power to Stabilize
    SETUP_CCP1(CCP_COMPARE_INT);
    EXT_INT_EDGE(H_TO_L);   //Falling Edge of Line Sync
    #asm
        bcf 0x0b,1              //Clear External Interrupt Flag
    #endasm
    ENABLE_INTERRUPTS(INT_EXT);
    ENABLE_INTERRUPTS(GLOBAL);
    while(syncdun ==0);         //Wait until Waveform Timing is Complete
} //End reset( )            //Load is OFF upon exit
void rddimlvl( ) {
    SET_ADC_CHANNEL(1);     //Set Mux for Dim Level
    delay_us(10);
    dodimlvl =0;                //Dual Slope Dimming to Linearize Pot And
    if (warmdun ==1){           //Slow down Dimming
        targetdim = (((READ_ADC( ) >>4) &0x0fff)+mindim); //11Bit Number 2048 Max
        if (targetdim > maxdim)
            targetdim =maxdim;
        diminc =10;
```

-continued

SOFTWARE IN "C":

```
    }
    if (dimcnt >(targetdim +diminc))
        dimcnt -=diminc;
    if (dimcnt <(targetdim -diminc))
        dimcnt +=diminc;
    if (dimcnt >targetdim)
        dimcnt -=1;
    if (dimcnt <targetdim)
        dimcnt +=1;
} //End rddimlvl( )
void rdmaxdim( ) {
    SET_ADC_CHANNEL(3);    //Set Mux for Max Dim Level
    delay_us(10);
    domaxdim =0;
    maxdim = (((READ_ADC( ) >>5) &0x07ff)+700); //11Bit Number
} //End rdmaxdim( )
```

The table below provides a list of components for the UCD 1200 according to a preferred implementation of the eighth embodiment.

TABLE

List of Components for UCD 1200

| Item | Quantity | Reference | Part | Vendor | Part Number |
|---|---|---|---|---|---|
| 1 | 1 | C1 | 470 uF 10 V | Digi-Key | P5126-ND |
| 2 | 1 | C2 | 0.47 uF 630 V | Digi-Key | EF6474-ND |
| 3 | 1 | C3 | Not Installed | | |
| 4 | 1 | C4 | .047 50 V | Digi-Key | P4965-ND |
| 5 | 1 | D1 | 5.6 Vz 1 W | Digi-Key | 1N4734DITR-ND |
| 6 | 1 | D2 | 1N4001 | Digi-Key | 1N4001GICT-ND |
| 7 | 1 | D3 | 5.1 Vz ½ W | Digi-Key | 1N5231BDITR-ND |
| 8 | 2 | J2, J1 | Thru Holes | | |
| 9 | 1 | Q1 | Q6016LH3 | Digi-Key | Q6016LH3_ND |
| 10 | 1 | R1 | 620 ½ W | Digi-Key | 620H-ND |
| 11 | 1 | R2 | 180 ½ W | Digi-Key | 180H-ND |
| 12 | 1 | R3 | 51K ¼ W | Digi-Key | 51KQBK-ND |
| 13 | 1 | R4 | 51K ⅛ W | Digi-Key | 51KEBK-ND |
| 14 | 1 | R5 | 100K ⅛ W | Digi-Key | 100KEBK-ND |
| 15 | 2 | R6, R9 | 4.7K ⅛ W | Digi-Key | 4.7KEBK-ND |
| 16 | 1 | R7 | 620 ⅛ W | Digi-Key | 620EBK-ND |
| 17 | 1 | R8 | Not Installed | | |
| *18 | 1 | SWPOT1 | 10K POT + Switch | CTS | 450S201 |
| 19 | 1 | U1 | MOC3022 | Digi-Key | 160-1376-5-ND |
| 20 | 1 | U2 | PIC16C774 | Digi-Key | IC16C774-ND |
| 21 | 1 | F1 | EMI Filter | | |
| 22 | 1 | W | Wire 8–12" Long | (CON1) Belden 16 AWG Color GRN (w/label "Safety GND") | |
| 23 | 1 | W | Wire 8–12" Long | (CON1) Belden 16 AWG Color BLK (w/label "AC Line") | |
| 24 | 1 | W | Wire 8–12" Long | (CON1) Belden 16 AWG Color RED (w/label "Load") | |

*NOTE:
(Except Molded Shaft Construction)

Different embodiments of the present invention have been described according to the present invention. Many modifications and variations may be made to the techniques and structures described and illustrated herein without departing from the spirit and scope of the invention. Accordingly, it should be understood that the apparatuses described herein are illustrative only and are not limiting upon the scope of the invention. With the use of an energy savings device according to an embodiment of the invention, it is possible to achieve a 50% or more energy savings, while not adversely affecting the perceived amount of light by users.

Also, the above-described embodiments of the present invention are capable of providing dimming for electronic ballast fluorescent fixtures, using the same electronics and software as those described earlier with respect to magnetic ballast fluorescent fixtures. Tests performed by the inventors showed a dimming capability for several different types of electronic ballast fluorescent fixtures, without any noticeable flickering. Therefore, an apparatus and method according to different embodiments of the present invention can be used to control resistive, inductive, and/or capacitive loads.

What is claimed is:

1. An energy savings device for an inductive, resistive or capacitive load that is powered by an input AC voltage waveform, comprising:

a setting unit configured to allow a user to set a desired power operating level for the load;

a processor configured to receive a signal from the setting unit indicative of the desired power operating level for the load, to determine a phase delay to be provided to an output AC voltage waveform that is to be provided to the load, and to output a control signal as a result thereof; and a synchronization circuit for synchronizing to a Safety Ground line, the synchronization circuit providing a synchronization signal that is used in construction of the control signal by the processor.

2. The energy savings device according to claim 1, further comprising:

an active element provided between a line that provides the input AC voltage waveform and the load, the active element receiving the control signal and turning off and on at predetermined times in accordance with the control signal, so as to create the output AC voltage waveform from the input AC voltage waveform.

3. The energy savings device according to claim 1, wherein the synchronization circuit comprises:

first and second resistors provided on a synchronization line connecting the processor to the Safety Ground line.

4. The energy savings device according to claim 1, wherein the load is either a fluorescent light fixture having either an external magnetic ballast or an electronic ballast, or a compact fluorescent light fixture having an internal ballast, and wherein the load is connected in series with the energy savings device.

5. The energy savings device according to claim 4, further comprising:

a motion detector configured to detect any motion within a particular area, and to provide a motion signal to the processor indicative as to whether or not any motion is detected, wherein the processor is configured to control a dimming level of the fluorescent light fixture based on the motion signal.

6. The energy savings device according to claim 1, further comprising an active element, wherein the active element comprises:

a first SCR having an anode terminal coupled to the line and having a cathode terminal coupled to the load; and a second SCR coupled in parallel to the first SCR, the second SCR having a cathode terminal coupled to the line and having an anode terminal coupled to the load.

7. The energy savings device according to claim 6, further comprising:

an opto-isolated triac provided between the processor and the active element, the opto-isolated triac providing the control signal to the first and second SCRs while providing a protection function for the microprocessor.

8. The energy savings device according to claim 6, further comprising:

a signal conversion unit, provided between a line that provides the input AC voltage waveform and the load, for receiving the control signal and turning off and on at predetermined times in accordance with the control signal, so as to create the output AC voltage waveform from the input AC voltage waveform; and an isolation circuit provided between the processor and the signal conversion unit, the isolation circuit providing the control signal to the first and second SCRs while providing a protection function for the processor.

9. An energy savings method for an inductive, resistive, or capacitive load that is powered by an input AC voltage waveform, the method comprising:

setting a desired power operating level for the load;

receiving, by a processor, a signal indicative of the desired power operating level for the load, and determining a phase delay to be provided to an output AC voltage waveform that is to be provided to the load, and to output a control signal as a result thereof; and synchronizing to a Safety Ground line, the synchronizing step resulting in a synchronization signal that is used in construction of the control signal by the processor.

10. The energy savings method according to claim 9, further comprising an active element, wherein the active element comprises:

a first SCR having an anode terminal coupled to the line and having a cathode terminal coupled to the load; and a second SCR coupled in parallel to the first SCR.

11. The energy savings method according to claim 9, further comprising:

receiving the control signal, and, in response thereto, turning an active element off and on at predetermined times in accordance with the control signal, so as to create the output AC voltage waveform from the input AC voltage waveform, wherein the active element is disposed between a line carrying the input AC voltage waveform and the load.

12. The energy savings method according to claim 9, wherein the load is either a fluorescent light fixture with an external magnetic ballast or an electronic ballast, or a compact fluorescent light fixture with an internal ballast, and wherein the load is connected in series with the processor.

13. The energy savings method according to claim 12, further comprising:

detecting any motion within a particular area, and providing a motion signal to the processor indicative as to whether or not any motion is detected; and controlling a dimming level of the fluorescent light fixture based on the motion signal.

14. An energy savings device for an inductive, resistive or capacitive load that is powered by an input AC voltage waveform, comprising:

setting means for allowing a user to set a desired power operating level for the load;

processing means for receiving a signal from the setting unit indicative of the desired power operating level for the load, and for determining a phase delay to be provided to an output AC voltage waveform that is to be provided to the load, and to output a control signal as a result thereof; and synchronization means for synchronizing to a Safety Ground line, the synchronization means providing a synchronization signal that is used in construction of the control signal by the processing means.

signal conversion means, provided between a line that provides the input AC voltage waveform and the load, for receiving the control signal and turning off and on at predetermined times in accordance with the control signal, so as to create the output AC voltage waveform from the input AC voltage waveform.

15. The energy savings device according to claim 14, wherein the synchronization means comprises:
   first and second resistors provided on a synchronization line connecting the processing means to the Safety Ground line.

16. The energy savings device according to claim 14, wherein the signal conversion means comprises:
   a first SCR having an anode terminal coupled to the line and having a cathode terminal coupled to the load; and
   a second SCR coupled in parallel to the first SCR, the second SCR having a cathode terminal coupled to the line and having an anode terminal coupled to the load.

17. The energy savings device according to claim 16, further comprising:
   isolation means provided between the processing means and the signal conversion means, the isolation means providing the control signal to the first and second SCRs while providing a protection function for the processing means.

18. The energy savings device according to claim 14, wherein the load is either a fluorescent light fixture having an external magnetic ballast or an electronic ballast, or a compact fluorescent light fixture having an internal ballast, and wherein the load is connected in series with the energy savings device.

19. The energy savings device according to claim 18, further comprising:
   motion detection means for detecting any motion within a particular area, and to provide a motion signal to the processing means indicative as to whether or not any motion is detected,
   wherein the processing means controls a dimming level of the fluorescent light fixture based on the motion signal.

* * * * *